(12) United States Patent
Tobiason et al.

(10) Patent No.: US 7,292,347 B2
(45) Date of Patent: Nov. 6, 2007

(54) DUAL LASER HIGH PRECISION INTERFEROMETER

(75) Inventors: Joseph D. Tobiason, Woodinville, WA (US); David W. Sesko, Woodinville, WA (US)

(73) Assignee: Mitutoyo Corporation, Kawasaki (JP)

( * ) Notice: Subject to any disclaimer, the term of this patent is extended or adjusted under 35 U.S.C. 154(b) by 327 days.

(21) Appl. No.: 11/193,437

(22) Filed: Aug. 1, 2005

(65) Prior Publication Data
US 2007/0024860 A1 Feb. 1, 2007

(51) Int. Cl.
*G01B 11/02* (2006.01)

(52) U.S. Cl. ..................................... 356/498

(58) Field of Classification Search ................ 356/498, 356/486, 487, 493, 500, 482
See application file for complete search history.

(56) References Cited

U.S. PATENT DOCUMENTS

| | | | |
|---|---|---|---|
| 4,355,899 A | | 10/1982 | Nussmeier |
| 4,611,915 A | | 9/1986 | Gillard et al. |
| 4,830,486 A | | 5/1989 | Goodwin |
| 4,832,489 A | | 5/1989 | Wyant et al. |
| 5,521,704 A | * | 5/1996 | Thiel et al. ................ 356/486 |
| 5,631,736 A | * | 5/1997 | Thiel et al. ................ 356/486 |
| 5,784,161 A | * | 7/1998 | Bechstein et al. .......... 356/487 |
| 6,304,330 B1 | | 10/2001 | Millerd et al. |
| 6,487,787 B1 | | 12/2002 | Nahum et al. |
| 6,741,357 B2 | * | 5/2004 | Wang et al. ................ 356/493 |
| 6,900,895 B2 | * | 5/2005 | Van Wiggeren ............ 356/477 |
| 6,934,035 B2 | * | 8/2005 | Yang et al. ................. 356/485 |
| 2003/0112444 A1 | * | 6/2003 | Yang et al. ................. 356/486 |
| 2004/0075841 A1 | * | 4/2004 | Van Neste et al. .......... 356/497 |
| 2006/0209307 A1 | * | 9/2006 | Kim ........................... 356/500 |
| 2007/0024859 A1 | * | 2/2007 | Bodermann ................ 356/498 |
| 2007/0103694 A1 | * | 5/2007 | Kato .......................... 356/482 |

FOREIGN PATENT DOCUMENTS

| EP | 1 505 365 A2 | 2/2005 |
|---|---|---|
| EP | 1 653 190 A1 | 5/2006 |

OTHER PUBLICATIONS

U.S. Appl. No. 10/972,403, filed Oct. 26, 2004, Sesko et al.
U.S. Appl. No. 11/088,961, filed Mar. 24, 2005, Sesko.

* cited by examiner

*Primary Examiner*—Patrick Connolly
(74) *Attorney, Agent, or Firm*—Oliff & Berridge, PLC

(57) ABSTRACT

An absolute distance measuring device based on laser interferometry may combine coarse, intermediate, and highest resolution measurement techniques to find the absolute distance to a sample surface with high resolution. The device may provide at least two laser wavelengths simultaneously, to allow reduction or elimination of certain common-mode error components, including dynamic error components. The device may scan at least one of the laser wavelengths over a relatively narrow range and may use quadrature detectors to provide enough signal data to allow certain self-corrections to be performed on the resulting scanned signals and measurements. A novel tunable laser and/or quadrature detector may provide advantages in combination with the device.

3 Claims, 15 Drawing Sheets

DUAL LASER HIGH PRECISION INTERFEROMETER

BACKGROUND

This invention is directed to interferometric measurement systems for measuring distances.

Laser interferometers are widely used to measure a distance to a sample surface. Laser interferometers operate by splitting a source of coherent radiation into two beams, an object beam and a reference beam, using, for example, a beam splitter. The reference beam is directed to a reference mirror which is located at a known distance from the beamsplitter. The object beam is directed to a sample surface or target which is located at some unknown distance from the beam splitter. The object beam is reflected from the sample surface, and is recombined with the reference beam at the beamsplitter. The object beam and reference beam constructively or destructively interfere, depending on the relative phase of the object beam compared to the reference beam. A detector measures the intensity of the interference light, which is related to the phase difference between the object beam and the reference beam, which is, in turn, related to the difference in the object path length from the beam splitter to the sample surface compared to the reference path from the beam splitter to the reference mirror. "Absolute" laser interferometer systems are known that use multiple wavelengths, and analyze the respective phase differences corresponding to the respective wavelengths to eliminate uncertainty regarding which specific wavelength or period of the cyclic interference light corresponds to a current measurement.

SUMMARY

An interferometric measurement system may use a sample interferometer which includes an object or sample path length or distance to a target or sample surface, and a reference interferometer that provides a reference path length. The sample interferometer may provide a plurality of respective optical phase measurements corresponding to the distance to the target, at a plurality of respective wavelengths to provide an absolute distance measuring capability. Similarly, the reference interferometer may provide a plurality of respective optical phase measurements corresponding to the reference path length, at a plurality of respective wavelengths, if desired. According to known principles, the distance to the target may then be determined to a first "coarse" resolution over an absolute range by multiplying the reference path length by a ratio formed by dividing a difference between respective optical phase measurements at respective wavelengths in the sample interferometer by a difference between respective optical phase measurements at respective wavelengths in the reference interferometer. If the respective wavelengths include wavelengths that are relatively closely spaced, this technique may be used to provide absolute distance measurements over a relatively large absolute measurement range. The respective wavelengths may be provided continuously along a scanned wavelength range, if desired, as one means of achieving a relatively large absolute measurement range.

Having determined the distance to a target at a coarse resolution over the absolute measurement range, a pair of known, "intermediately-spaced", optical wavelengths may be used to determine a corresponding pair of phase measurements, at least for the sample interferometer, and the phase difference between the phase measurements may be used to determine a phase measurement within an associated beat-frequency synthetic wavelength that is an "intermediate" wavelength that is longer than either of the pair of optical wavelengths, but shorter than the absolute measurement range. The phase within the associated synthetic intermediate wavelength may be used in combination with the first coarse resolution distance measurement to provide a refined, "intermediate resolution", absolute distance measurement. According to known principles, a sufficiently accurate coarse resolution distance measurement may be used to remove any ambiguity regarding how many whole wavelengths of the synthetic intermediate wavelength are included in the distance measurement, and that whole number of intermediate wavelengths may be added to the "intermediate resolution" phase measurement within the synthetic wavelength, to provide the refined, intermediate resolution, absolute distance measurement.

If desired, this procedure may be repeated using a second intermediately-spaced wavelength pair that have a shorter beat-frequency wavelength than the first pair, such that a sufficiently accurate first intermediate resolution distance measurement may be used to remove any ambiguity regarding how many whole wavelengths of a second intermediate wavelength corresponding to the shorter beat-frequency are included in a subsequent distance measurement based on the second wavelength pair. As before, that whole number of shorter intermediate wavelengths may then be added to the subsequent "second intermediate resolution" phase measurement within the corresponding shorter synthetic wavelength, to provide a further refined, improved intermediate resolution, absolute distance measurement.

Having determined the distance to a target at an intermediate resolution over the absolute measurement range, a known "fine" optical wavelength may be used to determine a respective phase measurement, at least for the sample interferometer. The phase measurement within the known fine wavelength may be used in combination with the intermediate resolution distance measurement to provide a "fine resolution", absolute distance measurement. That is, a sufficiently accurate medium resolution distance measurement may be used to remove any ambiguity regarding how many whole fine wavelengths are included in the distance measurement, and that number of whole fine wavelengths may be added to the fine resolution phase measurement, to provide the fine resolution, absolute distance measurement.

Such measurement principles are described in various articles and patents and may generally be known to one skilled in the art. Various aspects of such measurement principles are described, for example, in U.S. Pat. No. 4,355,899 to Nussmeier (the '899 patent), U.S. Pat. No. 4,611,915 to Gillard (the '915 patent), and U.S. Pat. No. 4,830,486 to Goodwin (the '486 patent), each of which is incorporated herein by reference in its entirety.

However, the prior art interferometric measurement systems and methods that have been used when applying such principles have included certain errors that are reduced or eliminated by certain aspects of the systems and methods disclosed herein.

According to one aspect of the invention, a first tunable laser emitting light in a first wavelength range may provide for measurement signals arising from light having a wavelength in the first wavelength range. The first tunable laser may provide a wavelength scan over a first wavelength range that may be relatively small, and may therefore be scanned at a relatively low rate of change, in comparison to a desired overall measurement rate for the absolute interferometric measurement system. According to a further aspect of the invention, this may allow the use of a highly accurate tunable diode laser that is tunable over the desired range, and that is also relatively simple, economical and reliable. One such tunable laser is disclosed in U.S. application Ser. No. 11/088,961, filed Mar. 24, 2005, which is incorporated herein by reference in its entirety. Signals arising from the wavelength scan over the first wavelength range may provide a plurality of optical phase measurements corresponding to the distance to the target, at a plurality of respective wavelengths, to provide an absolute distance measuring capability over a relatively long absolute measurement range.

According to another aspect of the invention, measurement signals in the interferometric measurement system may be provided by a quadrature detector that is configured to provide complementary signals that may be combined to reject certain common-mode error components. According to a further aspect of the invention, measurement signals from one or more quadrature detectors may be acquired simultaneously to allow elimination of additional common-mode error components, including dynamic error components.

Though various quadrature detectors may be used to provide the benefits outlined above, certain other errors may remain. For example, in various prior art quadrature detectors, phase shift error components may arise that depend partially on the wavelength of the light passing through the quadrature detector. Such errors may arise as the light is reflected and transmitted at various interfaces in a quadrature detector. Therefore, according to another aspect of the invention, it may be desirable to use a quadrature detector configuration that is effective at compensating for phase shift error components that arise along the various optical paths of a quadrature detector. One such quadrature detector that is particularly effective and desirable in this regard is a novel quadrature detector disclosed in U.S. application Ser. No. 10/972,403 (the '403 application), filed Oct. 26, 2004, which is incorporated herein by reference in its entirety.

According to another aspect of the invention, scanned wavelength data over the first wavelength range may provide enough signal data to allow certain "self-corrections" to be performed on the resulting scanned signals, which improves the associated measurement accuracy. In particular, the resulting scanned signals from a quadrature detector may be analyzed to provide corrections for offset, amplitude, and quadrature-phase errors (also called orthogonality errors). According to one implementation, the resulting scanned signals from a quadrature detector may be corrected by a compensation for offset, amplitude, and orthogonality errors that is uniform throughout the scan, to achieve a first level of quadrature signal compensation accuracy. According to a further aspect of the invention, the resulting scanned signals from a quadrature detector may be corrected by a plurality of respective compensations for offset, amplitude, and orthogonality errors that are determined and applied over a plurality of respective intervals throughout the scan, to achieve a second level of quadrature signal compensation accuracy that is improved relative to the first level of quadrature signal compensation accuracy.

According to another aspect of the invention, a second laser emitting light in a second wavelength range, different than the first wavelength range, may provide for measurement signals arising from light having a wavelength in the second wavelength range. Phase measurements based on the second wavelength range may be combined with phase measurements based on the first wavelength range to determine phase measurements over a range corresponding to an intermediate synthetic wavelength. Thus, a desired intermediate synthetic wavelength may be provided without requiring the first tunable laser scan range to include the second wavelength range. In one implementation, the second laser may provide a calibrated or reference wavelength that may also be used to calibrate the interferometric measurement system and/or to provide a known reference wavelength that may be used to provide high resolution, fine wavelength, phase measurements.

According to a further aspect of the invention, the measurement signals arising from light in the second wavelength range may be acquired simultaneously with signals arising from light in the first wavelength range, and the resulting signals may be processed to allow reduction or elimination of common-mode error components, including dynamic error components, that might otherwise be present in the intermediate synthetic wavelength phase signals.

According to another aspect of the invention, the second laser may, optionally, be a tunable laser, in order to provide certain additional accuracy advantages relative to a second laser that is fixed. A second laser that is tunable may provide a wavelength scan over a second wavelength range that may be relatively small, which may provide advantages similar to those described with respect to the first tunable laser.

According to a further aspect of the invention, scanned wavelength data over the second wavelength range may provide enough signal data to allow certain "self-corrections" to be performed on the resulting scanned signals, as previously described for the scanned signals over the first wavelength range, if desired. This may further improve the measurement accuracy of an interferometric measurement system. In particular, the resulting scanned signals from a quadrature detector that receives light from a second tunable laser may be corrected for offset, amplitude and orthogonality errors, as previously outlined for the first tunable laser, if desired.

According to another aspect of the invention, quadrature signal data may be acquired at a high rate to provide a number of measurement data points throughout a wavelength scan.

According to another aspect of the invention, the optical signal power may be monitored and measured simultaneously with the other signals corresponding to each measurement data point. The monitored optical signal power may then be used to perform an initial amplitude compensation or normalization for various signals, at each data point, if desired.

According to another aspect of the invention, a scanned wavelength from a first and/or second tunable laser may be passed through a rubidium absorption cell, or the like, to provide an absolute wavelength calibration reference, if desired. In one implementation, the absorption signal may be monitored and measured simultaneously with the other signals corresponding to each measurement data point. The absorption signal may be used to identify measurement data points, and/or measurement times, where the measurement data corresponds precisely to a reference wavelength of the absorption cell. Such measurement data can be used to calibrate a reference path length of a reference interferometer included in the interferometric measurement system.

According to another aspect of the invention, the wavelengths throughout a wavelength scan may also be corrected or compensated throughout the scan in a manner traceable to the wavelength calibration reference, if desired. According to another aspect of the invention, the phase measurements throughout a wavelength scan may also be corrected or compensated throughout the scan in a manner traceable to the wavelength calibration reference, if desired. According to another aspect of the invention, the distance measurements throughout a wavelength scan may also be corrected or compensated throughout the scan in a manner traceable to the wavelength calibration reference, if desired. According to another aspect of the invention, any of the foregoing measurement corrections or compensations may be provided or updated each measurement cycle, or each wavelength scan cycle, to provide dynamically calibrated or compensated measurements during normal operation.

According to another aspect of the invention, if the distance to be measured is varying sufficiently slowly, or is static, or is changing due to small amplitude vibrations that have a period that is short relative to the duration of a wavelength scan, then various distance measurements throughout a wavelength scan, or the precursor measurements used to determine the distance measurements, may be compensated and/or averaged to provide a more robust distance measurement under such conditions, if desired.

According to another aspect of the invention, wavelength scans may be performed by varying the wavelength at a rate that varies approximately sinusoidally, thus avoiding or reducing high driving forces, mechanical resonances, and other problems that may be associated with other wavelength scan profiles, such as sawtooth or triangular profiles, or the like.

These and other features and advantages of the systems and methods are described in, or are apparent from, the following detailed description of various exemplary embodiments.

BRIEF DESCRIPTION OF THE DRAWINGS

Various details are described below with reference to the following figures, wherein.

DETAILED DESCRIPTION

One figure of merit for an absolute interferometric measurement system is the ratio of the absolute measurement range of the system to the fine measurement resolution provided by the system. In many practical systems, this ratio may be limited by errors that may be present in the coarse and/or intermediate resolution measurements. Such errors may limit the accuracy of the coarse and intermediate resolution measurements, and thus limit their ability to reliably and unambiguously determine the number of whole wavelengths of the next finer wavelength that are included in the distance to the target. For example, a relatively coarser measurement must certainly be accurate to within plus or minus one-half of the next finer wavelength used, or the estimate of the number of whole wavelengths of the next finer wavelength may be in error, destroying the accuracy of the absolute measurement. More conservatively, the relatively coarser measurement may provide an accuracy approximately as good as +/−3/8 of the next finer wavelength, in order to avoid catastrophic errors. Various signal to noise (S/N) considerations, and the allowable relationships between various system wavelengths, and the like, are described in the previously incorporated patents, particularly the '486 patent.

As previously indicated, the prior art interferometric measurement systems and methods that have been used for providing absolute distance measurements have included certain errors that are reduced or eliminated by various aspects of the systems and methods disclosed herein. Furthermore, the systems and methods disclosed herein may include components, and combinations of components, that are particularly robust and economical in comparison to the range-to-resolution figure of merit, as well as the final measurement accuracy, that are provided. Furthermore, the systems and methods disclosed herein may include components, and combinations of components, that are particularly compact for an absolute interferometric measurement system and/or in comparison to the range-to-resolution figure of merit, as well as the final measurement accuracy, that are provided. For example, in various implementations, the systems and methods disclosed herein may be used to measure a distance to a sample surface over an absolute range of 1 meter or more with sub-nm resolution, with a suitable target surface. The systems and methods disclosed herein may also enhance the measurement accuracy and robustness for relatively weak measurement signals, for example when a target surface reflects relatively little light to the system.

Figure 1:
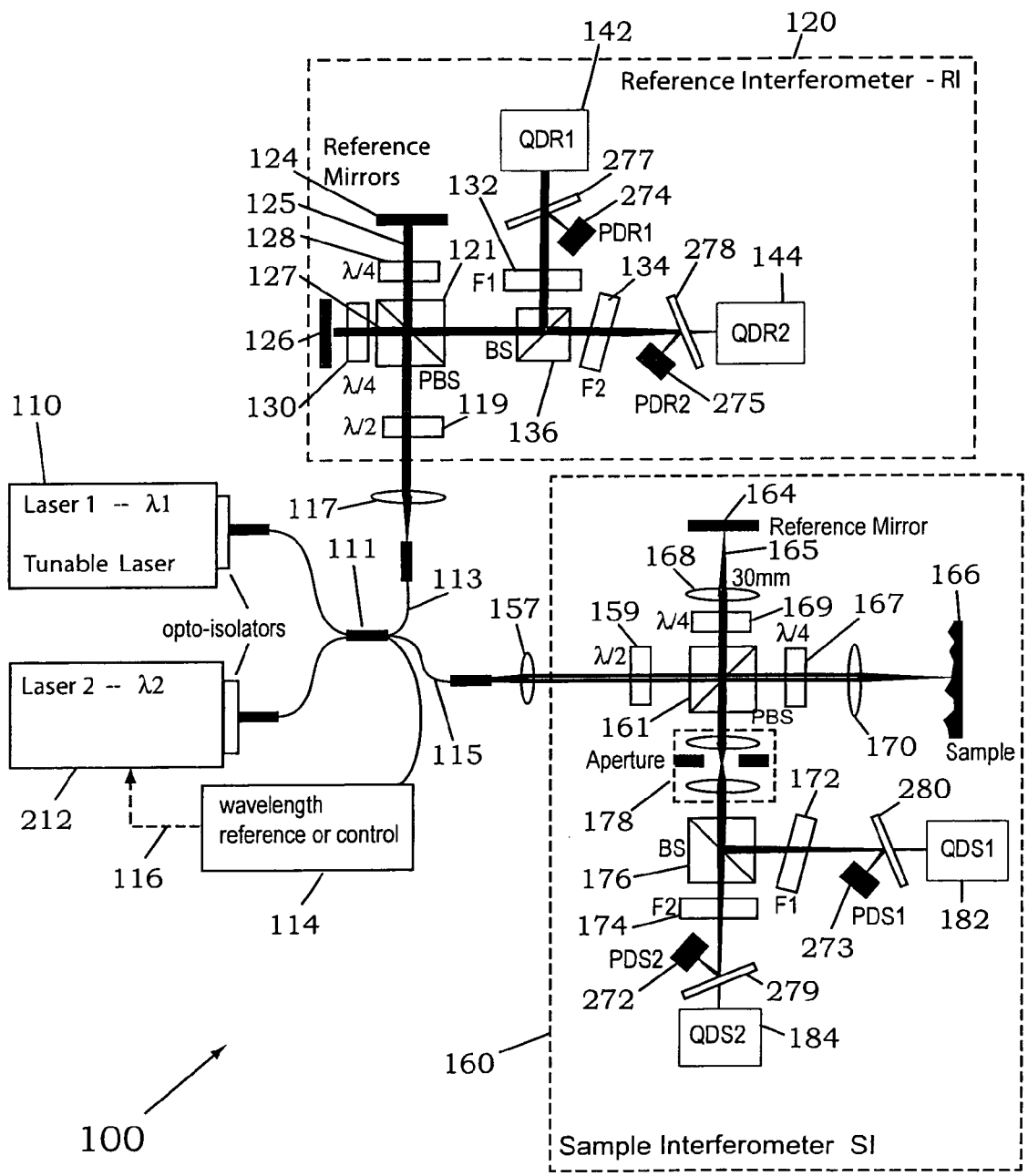
FIG. 1 illustrates an exemplary dual laser interferometric measurement system usable for absolute distance measurement.

FIG. 1 shows an exemplary interferometric measurement system 100 which can be used to practice the methods disclosed herein. The interferometric measurement system 100 comprises two lasers, a sample interferometer 160, and a reference interferometer 120. A tunable laser 110 may output a tunable wavelength λ1 over a first wavelength range and a second laser 212 may output a wavelength λ2. In various configurations and/or operating modes, the second wavelength λ2 may be either a fixed wavelength, or tunable wavelength over a second wavelength range. The outputs of lasers 110 and 212 are combined at an optical coupler 111, and routed to the reference interferometer 120 and the sample interferometer 160. In the configuration shown in FIG. 1, they may also be routed to a wavelength reference or control 114, described in greater detail below.

The laser 110 generates coherent light having a wavelength λ1 that may be tunable over a desired wavelength range that may include a particular desired wavelength, for example, about 780 nm. The tunable laser 110 may be a tunable external cavity diode laser that provides a desired range of wavelength tuning without mode hops. The external cavity may decrease the phase noise relative to that provided by a solitary laser diode. The external cavity may be designed so that the laser can be tuned throughout a tuning range without hopping between longitudinal modes, by including a path length compensation element, which alters the optical path length of the laser cavity as it is tuned. In various configurations, the tunable external cavity diode laser design(s) disclosed in the previously incorporated in U.S. application Ser. No. 11/088,961, filed Mar. 24, 2005 (also refered to as the '961 application and the '961 laser), may be used for the tunable laser 110.

It should be appreciated that the tuning range of the '961 laser and the tuning range of the first tunable laser 110 that is utilized by the interferometric measurement system 100 may be selected to be mutually compatible and beneficial. That is, the interferometric measurement system 100 may use a relative small tuning range for the tunable laser 110, and the '961 laser may be optimized for such a tuning range, as described in the '961 application. Thus, the interferometric measurement system 100 may be made particularly economical, robust, accurate and compact, in combination with the '961 laser. The '961 laser is briefly described below with reference to FIGS. 2A and 2B. Other laser sources that may be used for the tunable laser 110 include distributed Bragg reflector (DBR) lasers, or any other now-known or later developed tunable laser that may provide a usable wavelength range.

In various configurations of the interferometric measurement system 100, the laser 212 may be either a fixed wavelength laser, or tunable wavelength laser, for example, similar to the tunable laser 110. Although the following disclosure emphasizes configurations where the laser 212 is a tunable laser, in various other configurations outlined herein, the laser 212 may be a single wavelength laser. In various configurations, a single wavelength laser 212 may be a stabilized single wavelength diode laser, if desired. A single wavelength laser 212 may be well stabilized or controlled to provide a desired reference wavelength, usable for a highly accurate fine wavelength measurement as outlined above and described in greater detail below, if desired.

It should be appreciated that in various configurations where the laser 212 may be a tunable wavelength laser, such as the '961 laser, for example, the tuning range used for the laser 212 may be selected to be mutually compatible and beneficial with the tuning range utilized by interferometric measurement system 100. That is, the interferometric measurement system 100 may use a relative small tuning range for the a tunable laser 212, and the '961 laser may be optimized for such a tuning range, as described in the '961 application.

In the configuration shown in FIG. 1, the output of the tunable laser 110 and the laser 212 may be directed to the polarization maintaining optical coupler 111, which may split the signal into two different output fibers 113 and 115. Fiber 113 may direct the light through a collimating lens 117, to a half wave plate 119, and to the reference interferometer 120. Similarly, fiber 115 may direct the light through a collimating lens 157, to a half wave plate 159, and to the sample interferometer 160. The half wave plates 119 and 159 may be respectively rotated or adjusted to rotate the effective polarization direction of the light input to polarizing beam splitters 121 and 161, respectively. This may in turn adjust the respective intensities of the orthogonally polarized components of the light output to the respective arms of the interferometers 120 and 160, respectively, according to known techniques. This may be particularly useful for the sample interferometer 160, because the light reflected from a low reflectivity sample surface 166 may otherwise be of much lower intensity than light reflected from a reference mirror 164. Therefore, if the corresponding input light components would otherwise have significantly dissimilar intensities, it may be desirable to compensate for this effect. In general, subsequent signal processing may be simplified if the net reflected intensities are similar.

Unless otherwise indicated by explicit description or by context, the following discussion assumes that the laser 212 is a tunable laser. The laser 212 may generate coherent light having a wavelength λ2 that may be tunable over a desired wavelength range that may include a desired particular wavelength, for example, about 795 nm. The light output from laser 212 may be directed to the optical coupler 111, and may also be directed to a wavelength reference and/or control device 114. In various configurations the wavelength reference and/or control device 114 may provide a feedback signal 116 to the laser 212, to control or stabilize the laser at a desired wavelength. For example, regardless of whether the laser 212 is a fixed laser or a tunable laser, the wavelength reference and/or control device 114 may provide a control signal used to control or stabilize the laser 212 at a precise reference wavelength usable by the interferometric measurement system 100 to provide traceable, high accuracy, measurements. Such control and/or stabilization may be provided according to any suitable now-known or later-developed technique.

In various other embodiments, the wavelength reference and/or control device 114 may simply provide one or more signals usable to identify when one or more reference wavelengths are output from the lasers 110 and/or 212, without actually controlling such wavelengths. The utility of such a technique will be apparent from various exemplary methods outlined in greater detail below. Briefly, such signals may provide sufficient information to identify signals and/or measurements of the interferometric measurement system 100 that correspond to one or more traceable reference wavelengths, and that therefore are known to be accurate and/or traceable distance measurements. Furthermore, such signals may also be used as the basis for correcting or compensating other signals and or measurements of the interferometric measurement system 100, even when such signals do not correspond to the reference wavelength(s), in order to provide improved accuracy, as described in greater detail below.

In various configurations, the wavelength reference and/or control device 114 may include an absolute atomic or molecular reference such as the rubidium D1 or D2 lines, a relative reference such as a stabilized interferometer, or other suitable devices or methods. One configuration that includes a rubidium absorption cell that receives light from the lasers 110 and 212 through the optical coupler 111 is described in greater detail below.

Reference interferometer 120 may include a reference interferometer beam path that comprises a polarizing beam splitter 121, two quarter wave plates 128 and 130, two reference mirrors 124 and 126, a beam splitter 136, two optical filters 132 and 134, two optical power detectors 274 and 275, two partially reflecting surfaces 277 and 278, and two quadrature detectors, the λ1 quadrature detector 142 and the λ2 quadrature detector 144. At the reference interferometer 120, and after traversing the collimating lens 117 and the half wave plate 119, the input light may be incident on polarizing beam splitter 121, which may split the beam into two properly oriented orthogonally polarized output beams, that may have intensities that depend on the polarization direction of the input light from the half wave plate 119, as previously outlined. The beam of light transmitted through the polarizing beam splitter 121 may be directed through the first quarter wave plate 128 and onto first reference mirror 124. The first quarter wave plate 128, in a double pass arrangement, may rotate the plane of polarization of the beam by 90 degrees, so that the P-polarized light which was transmitted through the polarizing beam splitter may be turned into S-polarized light which may be reflected by the polarizing beam splitter 121 on the second pass.

The beam that was reflected by the polarizing beam splitter 121 may be directed through the second quarter wave plate 130, and onto the second reference mirror 126. The second quarter wave plate 130, in a double pass arrangement, may rotate the plane of polarization of the beam by 90 degrees, so that the S-polarized light which was reflected from the polarizing beam splitter may be turned into P-polarized light which may be transmitted by the polarizing beam splitter 121 on the second pass. The two respective beams of light may be reflected off the reference mirrors 124 and 126, and re-enter the polarizing beam splitter 121, whereby the beams may interfere according to the relative distances between the polarizing beam splitter 121 and the first reference mirror 124, and the polarizing beam splitter 121 and the second reference mirror 126. The recombined beam may then be directed to a second beam splitter 136, which may again divide the beam into two beams, and direct one beam into the λ1 quadrature detector 142, via the λ1 optical filter 132, and the second beam into the λ2 quadrature detector 144, via the λ2 optical filter 134.

The λ1 optical filter 132 may transmit only light arising from the tunable laser 110, using, for example, an etalon with a pass band that covers the wavelengths within the λ1 wavelength range used by the interferometric measurement system 100. Similarly, the λ2 optical filter 134 may transmit only light arising from the laser 212, using, for example, an etalon with a pass band that covers the wavelength or wavelengths within the λ2 wavelength range used by the interferometric measurement system 100. In other implementations the optical filters 132 and 134 may be respective gratings of sufficient resolving power to effectively separate and/or select the respective λ1 or λ2 wavelengths. After passing through the λ1 optical filter 132, the light may be incident on an optional partially reflecting surface 277, for example, the surface of a nominally transparent material, which may reflect a portion of the light to an optional optical power detector 274, the light may then be input to the λ1 quadrature detector 142. After passing through the λ2 optical filter 134, the light may be incident on an optional partially reflecting surface 278, which may reflect a portion of the light to an optional optical power detector 275, the light may then be input to the λ2 quadrature detector 144.

The various optical power detectors 272-275 described herein may comprise photodiodes, or any other suitable device that may provide an output signal indicative of the optical intensity of the light transmitted to the various quadrature detectors. In one alternative to the power detector arrangement shown in FIG. 1, a single optical power detector may be provided at any one of the locations shown in FIG. 1, or at another suitable location, and the resulting signal may be used to provide a first level of optical power correction or compensation for all of the raw quadrature detector signals described herein. In another configuration alternative, none of the optical power detectors shown in FIG. 1 are provided, and the raw quadrature detector signals described herein are self-corrected or compensated for optical power variations as outlined further below. However, it should be appreciated that if the respective raw quadrature signals are amplitude-corrected or compensated based on one or more optical power signals, the subsequent signal processing and/or refined correction or compensation may be simplified and/or made more robust with regard to unforeseen operating conditions, and the like. In such a case, since the various optical filters disclosed herein may have a transmission characteristic that depends strongly on wavelength, locating one or more optical power detectors downstream from the optical filters as illustrated in FIG. 1 may be desirable, for correcting the raw quadrature signal for power variations due to variable filtering effects at the various wavelengths used in the interferometric measurement system 100.

The λ1 and λ2 quadrature detectors 142 and 144 may be detectors that generate parallel signals that depend on the difference between a first optical path length between the polarizing beam splitter 121 and the first reference mirror 124, and a second optical path length between the polarizing beam splitter 121 and the second reference mirror 126. The difference between the first optical path and the second optical path in the reference interferometer 120 may be referred to as the reference path length, or the reference length. The design details and the functioning of the quadrature detectors 142 and 144 are described further below.

The purpose of reference interferometer 120 is to provide a reference interferometer beam path having a reference optical path length that may be characterized or calibrated to a high precision. The reference optical path length may then be used to facilitate a relatively accurate coarse absolute distance as outlined above and described in greater detail below. The high precision reference optical path length may furthermore be used in other various correction techniques that may be applied to other signals and/or measurements determined for the interferometric measurement system 100, as outlined in greater detail below. Since various dimensions and optical properties of the interferometric measurement system 100, and particularly the sample interferometer 160, can be expected to change with changing external conditions, such as temperature and vibration, the high precision reference optical path length can provide a normalization factor to correct for these effects, described below. In various practical implementations, the reference interferometer may provide reference optical path length mechanical stability or repeatability of approximately 1 part in $10^4$. As outlined further below, in various implementations, using a method based on using the rubidium D1 and D2 wavelength (frequency) references, the reference optical path length may be dynamically calibrated at various desired times during normal operation of the interferometric measurement system 100, to an accuracy or repeatability of approximately 1 part in $10^6$. Such a dynamic calibration may be performed during each measurement cycle, if desired, which may allow the operation of the interferometric measurement system 100 to remain accurate and robust, even when operating in various industrial environments which would otherwise be incompatible with such levels of accuracy and repeatability.

The sample interferometer 160 may include a sample interferometer beam path that comprises components similar to those previously described for the reference interferometer 120, including the collimating lens 157, the half wave plate 159, first and second quarter wave plates 169 and 167, a polarizing beam splitter 161, a focusing lens 168, an objective lens 170, a reference mirror 164, a sample surface 166 (also referred to as a target, or target surface), a telecentric aperture arrangement 178, a beam splitter 176, λ1 and λ2 optical filters 172 and 174, respectively, an optional partially reflecting surface 279 and optional optical power detector 272, an optional partially reflecting surface 280 and optional optical power detector 273, and two quadrature detectors, the λ1 quadrature detector 182 and the λ2 quadrature detector 184.

At the sample interferometer 160, and after traversing the collimating lens 157 and the half wave plate 159, the input light is incident on the polarizing beam splitter 161. Polarizing beam splitter 161 may function similarly to polarizing beam splitter 121 of the reference interferometer 120, to transmit P-polarized light, and to reflect S-polarized light. The transmitted light may then be incident on the first quarter wave plate 167, which in a double pass arrangement may rotate the plane of polarization of the beam by 90 degrees, so that the P-polarized light which was transmitted through the polarizing beam splitter 161 may be turned into S-polarized light which may be reflected by the polarizing beam splitter 161, on the second pass. The second quarter wave plate 169, in a double pass arrangement, may rotate the plane of polarization of the beam by 90 degrees, so that the S-polarized light which was reflected from the polarizing beam splitter 161 may be turned into P-polarized light which may be transmitted by the polarizing beam splitter 161 on the second pass.

Light which is reflected at the first pass of the polarizing beam splitter 161 may become a reference beam of the sample interferometer 160, by traversing the quarter wave plate 169 before passing through an optional focusing lens 168 and reflecting from a reference mirror 164 at a first optical path length from the polarizing beamsplitter 161. Light which is transmitted at the first pass of the polarizing beam splitter 161 may become the object beam of the sample interferometer 160, by traversing quarter wave plate 167 and an objective lens 170 before reflecting from the sample surface 166 at a second optical path length from the polarizing beam splitter 161. The difference between the first optical path length and the second optical path length in the sample interferometer 160 may be referred to as the measurement path length. The measurement distance to the sample 166 is one half of the measurement path length. The optional focusing lens 168 may be omitted. However, in various applications it may be advantageous for making the alignment of the reference mirror 164 less critical and/or balancing the first and second optical paths of the interferometer 160 with respect to dispersion and environmentally induced changes to the refractive index of the various components along the first and second optical paths, etc.

Regarding the objective lens 170, it is used to both focus the object beam onto the sample 166 and to collect the light reflected from the sample 166. The numerical aperture (NA) of the objective lens 170 may govern the working range and lateral resolution of the interferometer. The depth of focus (DOF) of the objective lens may limit the working range of the system, and is given by twice the Rayleigh range, $$DOF = \frac{8\lambda}{\pi}(f/D)^2 \qquad (1)$$

where D is the diameter of the object beam at the objective lens 170, and f is the focal length of the objective lens. The spot diameter d at the sample 166 may limit the lateral resolution, and is given approximately by:

$$d = 2\omega_0 = \frac{4\lambda f}{\pi D} \qquad (2)$$

The NA of the objective lens 170 may determine the surface finish and/or the amount of surface tilt that is allowable for the sample 166. These factors may determine the amount and distribution of the light reflected from the sample 166. Accordingly, since the NA of the objective lens 170 determines the light collecting efficiency of the system, for such surfaces it may determine the signal strength and the associated resolution achievable by the sample interferometer 160.

At the polarizing beam splitter 161, the light from the reflected reference beam may be recombined with light from the reflected object beam, and directed to pass through an aperture arrangement 178 to the second beam splitter 176. The second beam splitter 176 may split the beam into two respective beams of nominally equal intensities, and direct one beam toward the λ1 quadrature detector 182, via the λ1 optical filter 172, and the second beam toward the λ2 quadrature detector 184, via the λ2 optical filter 174. The λ1 optical filter 172 and λ2 optical filter 174 may be constructed and operated similarly to the previously described λ1 optical filter 132 and λ2 optical filter 134. After passing through the λ1 optical filter 172, the light may be incident on an optional partially reflecting surface 280, which may reflect a portion of the light to an optional optical power detector 273, the transmitted light being input to the λ1 quadrature detector 182. After passing through the λ2 optical filter 174, the light may be incident on an optional partially reflecting surface 279, which may reflect a portion of the light to an optional optical power detector 272, the transmitted light being input to the λ2 quadrature detector 184. Considerations related to partially reflecting surfaces and optical power detectors have been outlined above.

In various embodiments, the aperture arrangement 178 may be optional. For example, when the sample 166 is a mirror surface or the like, and/or the lateral resolution of the distance measurement is not critical, the aperture arrangement 178 and the focusing lens 168 may both be omitted without a loss of performance. The aperture arrangement 178 may be designed to prevent the occurrence of a detrimental speckle pattern at the detectors of the sample interferometer 160, when the surface of the sample 166 might otherwise give rise to speckles, that is, patterns of small light and dark regions where coherent light reflected from various surface roughness features of the sample 166 may constructively and destructively interfere, respectively. When it is included, in various embodiments the aperture arrangement 178 may include an input imaging lens, an aperture, and an output imaging lens. As shown in FIG. 1, the light may be directed from the polarizing beam splitter 161 through the input imaging lens, then through the aperture, which spatially filters the light, and then through the output imaging lens. Such telecentric arrangements are known in the art for various interferometers that are similar to that shown in FIG. 1. Two related considerations may apply for appropriately selecting the design of the aperture arrangement 178. The considerations relate to the allowable speckle size, i.e., the size of speckles that may be produced at the quadrature detectors 182 and 184 without adversely affecting performance, and the lateral resolution that may be determined by the aperture arrangement 178. In general, in applications where speckle may be present, the nominal speckle size coincides with the nominal lateral resolution of the system.

In various exemplary embodiments, Eq. (3) may be used to analyze and adjust the nominal lateral resolution LR due to the aperture arrangement 178, and/or the nominal speckle size S:

$$LR = S = 1.22(M+1)*\lambda*f/a \qquad (3)$$

where:
  M is the magnification;
  f is the focal length of the imaging lenses;
  a is the effective aperture dimension; and
  λ is the relevant wavelength of the light emitted by the laser source(s)

It should be appreciated that the speckle size obtained in configurations where a collimated coherent reference beam wavefront is mixed with the object beam wavefront by a polarizer included in a quadrature detector, may actually be approximately twice that indicated by Eq. (3). In any case, it should be appreciated that the design of aperture arrangement 178 may be experimentally adjusted to determine a desired speckle size and/or lateral resolution for a given application. The speckle size may be determined such the signals of the various quadrature detectors disclosed herein do not include spurious effects due to the individual intensity of a single speckle, or a few speckles, distorting the nominal intensity that would otherwise be expected at a detector based on the distance to the sample 166. This may depend on the size of the speckles in relation to the effective area of the photodetectors that may be included in the various quadrature detectors disclosed herein.

The various electronic and/or optoelectronic components of the interferometric measurement system 100 may be connected to a signal processing and control system according to known methods. The signal processing and control system may provide various control signals to the interferometric measurement system 100, and acquire and process various measurement signals obtained from the interferometric measurement system 100, as outlined above and described in greater detail below. The signal processing and control system may comprise a PC and various data acquisition and control cards, or the like, and/or various custom circuits, in various implementations. Applicable signal processing and control system techniques and circuits are generally known in the art and need not be described in detail here.

Figure 2A:
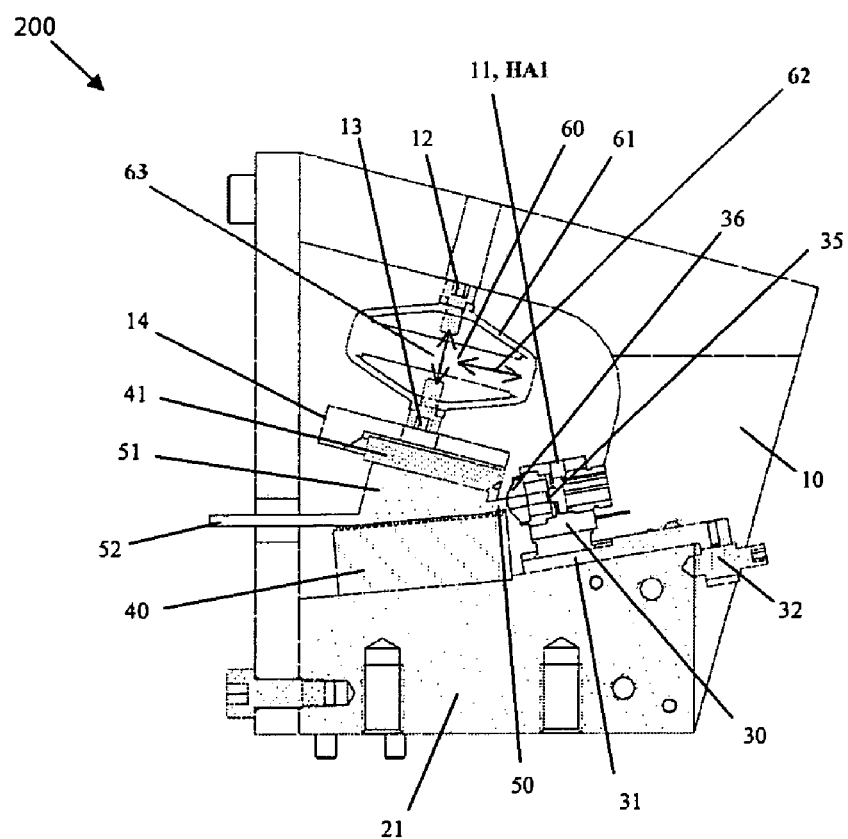
FIG. 2A is a cross-sectional side view through the laser beam plane of an exemplary tunable external cavity diode laser assembly usable in conjunction with the interferometric measurement system of FIG. 1.
Figure 2B:
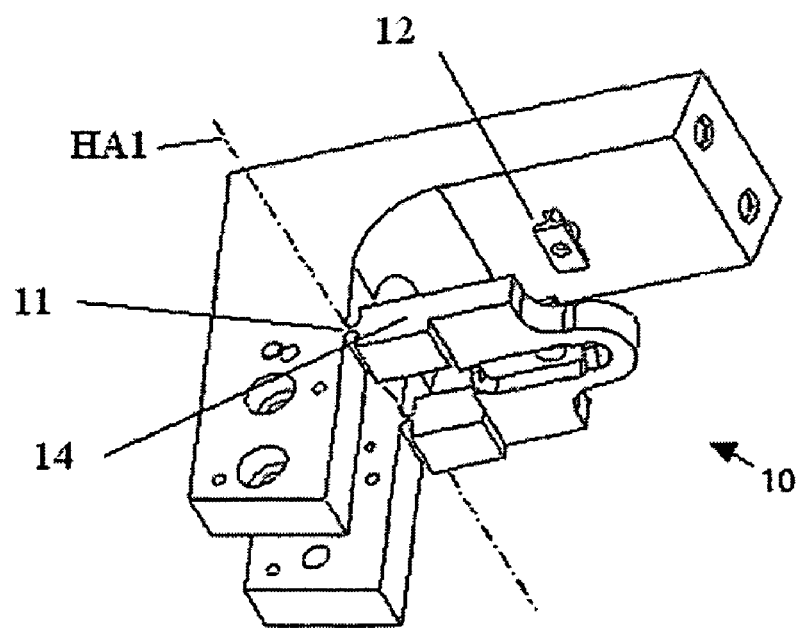
FIG. 2B is an isometric views of an exemplary flexure body included in the exemplary tunable external cavity diode laser assembly shown in FIG. 2A.

FIGS. 2A and 2B show an exemplary tunable external cavity diode laser 300 usable as a tunable laser in conjunction with this invention. FIG. 2A shows a cross-sectional side view through the laser beam plane of the external cavity diode laser 300 and FIG. 2B shows an isometric views of an exemplary flexure body 10 included in FIG. 2A. The tunable external cavity diode laser 300 is described briefly below, and in detail in the incorporated '961 application. The external cavity diode laser 300 may be used as the tunable laser 110 of the interferometric measurement system 100, if desired, and/or the laser 212, in configurations where it is a tunable laser. Briefly, the external cavity diode laser 300 may comprise an exemplary flexure body 10 that provides a tuning element and a laser radiation source comprising an adjustable laser diode module 30 positioned to accommodate chromatic dispersion effects, as described in the incorporated '961 application. The laser diode module 30 is shown installed in the flexure body 10. The flexure body 10 may include a flexure arm 14 which may be attached to the flexure body 10 by the flexure hinge structure 11, obscured in FIG. 2 by the laser diode module 30. Two actuator driver mounting flexures 12 and 13 may attach a piezoelectric transducer 60 to the frame of the flexure body 10 and the flexure arm 14. The piezoelectric transducer 60 may include a linkage frame 61 that is used to attach the piezoelectric transducer 60 to the flexures 12 and 13. Flexures 12 and 13 may be designed to be more compliant than flexure hinge structure 11.

Alternative types of actuator drivers may be used, such as actuators based on magnetostriction, voice coil actuation, direct current (DC) and stepping motor actuation However, the piezoelectric transducer 60 including the linkage frame 61 may have the advantage that the linkage frame 61 is sufficiently compliant to effectively provide additional degrees of freedom, in addition to the flexures 12 and 13, to help insure that the moving and/or flexing elements of the external cavity diode laser 300 are not mechanically over-constrained. This, in turn, may help to insure that the flexure hinge structure 11 is not significantly stressed or distorted during actuation and deflection of the flexure arm 14 and mirror 41, which may contribute to the ability of the design to maintain an effectively stationary hinge axis and/or pivot point, and may also help to insure that the yield strength of the flexure material is not exceeded under the expected operating ranges and conditions.

The flexure body 10 may be formed of any elastic material, for example, tempered spring steel such as PH17-4. Various hardening processes may also be applied in the regions of the various flexures to increase their yield strength, if desired. The flexure body 10 may be attached to an optical bench 21 that may have both a diffraction grating 40 and the laser diode module 30 mounted on its surface. The optical bench 21 may be precision machined so that the surface carrying the diffraction grating 40 is at a well-defined angle relative to the surface carrying the laser diode module 30, which may be mounted to a laser cell base 31. In such a configuration, the laser cell base 31 and the attached laser diode module 30 may be translated along the mating surface of the optical bench 21 approximately along the direction of the collimated output beam 50, in order to adjust a distance between the laser diode module 30 and the diffraction grating 40 to obtain mode-hop free tuning, as outlined in the incorporated '961 application.

The laser diode module 30 may comprise a laser gain medium 35 and a collimating lens 36. The collimating lens 36 may collimate the P-polarized beam exiting the front facet of the laser gain medium 35. This collimated output beam 50 may be incident on the diffraction grating 40 at a grazing incidence. Diffraction grating 40 may diffract the laser beam into a diffracted first order beam 51. The zero-order reflection of the laser beam off the diffraction grating 40 constitutes an output beam 52 from the external cavity laser 300.

The first order diffracted beam 51 may be incident on a tuning mirror 41, which may be mounted on a mounting surface of the flexure arm 14, and a selected wavelength may be retroreflected by the tuning mirror 41 back onto diffraction grating 40 and diffracted back into laser gain medium 35 of the laser diode module 30. In this way, depending on the angular deflection of the flexure arm 14, the tuning mirror 41 may select the wavelength which is fed back into laser gain medium 35, as the wavelength being that which is diffracted at normal incidence to the effective reflection plane of the tuning mirror 41 from the diffraction grating 40. Therefore, angular deflection of the tuning mirror 41 may determine the output wavelength of the external cavity laser 300.

The angular deflection of the tuning mirror 41 about the hinge axis HA1 (as shown, for example, in FIG. 2 of the incorporated '961 application) may be adjusted by controlling the piezoelectric transducer 60. For example, applying a relatively large plus or minus voltage to the transducer 60 may cause the transducer 60 to expand or contract by a relatively large amount along the direction 63. The expansion or contraction may cause a downward (pushing) force or upward (pulling) force, respectively, to be exerted on flexure arm 14, which may cause flexure arm 14 to rotate about the approximately stationary hinge axis HA1 of the flexure hinge structure 11. The motion of flexure arm 14 may cause tuning mirror 41, mounted to the flexure arm 14, to change its angle relative to diffraction grating 40, as well as its distance from the diffraction grating 40, in a synchronized manner appropriate for mode-hop-free tuning.

Because the flexure hinge structure 11 has no relatively-moving parts, it may not suffer from stiction or backlash. In addition, when operating stresses are designed properly with respect to the yield strength of the flexure material, which may include taking into account fatigue factors and the like, according to known techniques, the flexure hinge structure 11 may have an essentially unlimited useable lifetime.

In one embodiment of the design shown in FIGS. 2A and 2B, the desired tuning range may be on the order of approximately +/−0.5 nm. To achieve such a tuning range, the nominal optical path length distance $L_1$ between laser gain medium 35 and diffraction grating 40 may be about 1.905 mm, for example, and the nominal distance $L_2$ between grating 40 and the effective reflection plane of the tuning mirror 41 may be about 1.167 mm, for example. The flexure arm 14 may deflect by about +/−0.1 degrees, for example, in order to tune external cavity laser 300 over a tuning range on the order of approximately +/−0.5 nm or +/−1.0 nm. More generally, the mechanical configurations for the external cavity tunable diode laser 300 may be particularly suitable for desired tuning ranges on the order of approximately +/−0.5 nm, +/−1.0 nm or +/−5 nm. For example, the flexure hinge structures and the chromatic dispersion accommodation features provided by the external cavity tunable diode laser 300 are compatible with use over such tuning ranges, and provide numerous improvements in terms of tuning response speed and/or actuator power, operating stability and/or accuracy, number of parts, and/or ease of assembly and adjustment for mode-hop-free tuning, for use with such tuning ranges. The prior art use of tunable lasers in absolute interferometric measurement systems has not recognized the value of such features, combinations of features, and/or exemplary dimensions because they may not be compatible with the tuning ranges and/or applications contemplated by prior art absolute interferometric measurement systems. It should be recognized that the various configurations and combinations of features disclosed for the external cavity tunable diode laser 300 may be particularly desirable in combination with the absolute interferometric measurement systems and methods disclosed herein, wherein tuning ranges on the order of +/−0.5 nm, +/−1.0 nm, or +/−5 nm may be both desirable and sufficient.

Figure 3A:
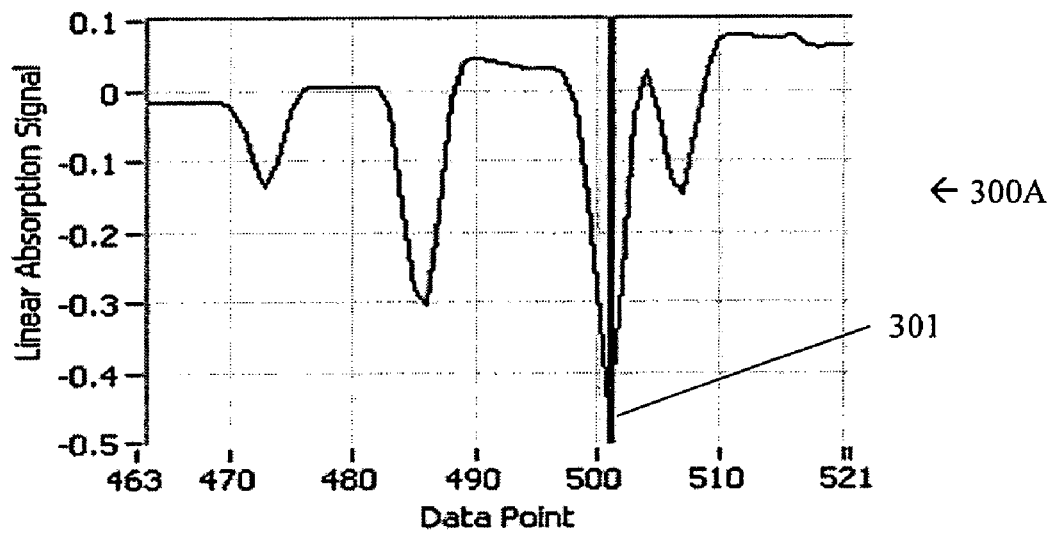
FIGS. 3A and 3B illustrate signals obtained from an exemplary absolute wavelength reference usable in conjunction with the interferometric measurement system of FIG. 1.
Figure 3B:
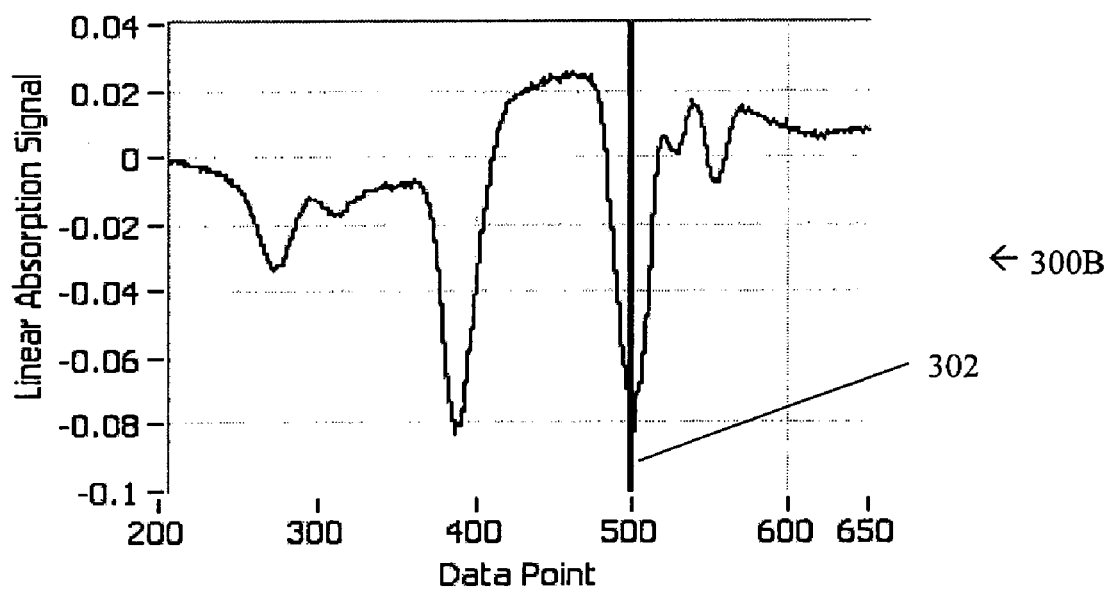

FIGS. 3A and 3B illustrate signals 300A and 300B, respectively, obtained from an exemplary wavelength reference usable as a wavelength reference and/or control device in conjunction with this invention. Such a wavelength reference may be used as the wavelength reference and/or control device 114 of the interferometric measurement system 100, if desired. Such a wavelength reference may provide one or more traceable wavelength standards. That is, the wavelength reference may act as a metrological transfer standard, recognized as a wavelength standard comparable to, or traceable to, a primary standard recognized by various metrological standards organizations throughout the world.

In various configurations, the linear absorption signals 300A and 300B may be provided by passing the light from the tunable laser 110 and a tunable laser 212 through a rubidium vapor cell that may be included in the wavelength reference and/or control device 114. The light output from the cell may pass into a detection channel that includes a filter that is suitable for selecting desired wavelengths in the range of the λ1 wavelengths of the tunable laser 110, and then into a low-noise photodetector circuit that can be used to provide the signal 300A. In one example, the λ1 vacuum wavelengths may be approximately in a range of 780.2+/−0.5 nm, or so. As shown in FIG. 3A, the signal 300A may then include features corresponding to the $^{85}$Rb and $^{87}$Rb D2 lines of the rubidium vapor cell.

As previously outlined, any of the measurement signals disclosed herein may be provided in a simultaneously measured set of signals, acquired using a suitable high-speed multi-channel analog-to-digital data acquisition system, for example, such that each signal in the set corresponds to the same instantaneous state of the interferometric measurement system 100 as the tunable laser wavelength(s) is/are scanned, for example. Each such set of signals corresponds to a unique "data point". The data points may be acquired repetitively at high speed. It should be appreciated that if the timing of the data points is deterministic, or known, then any axis shown herein as a "data point" axis could just as well be characterized as a time axis.

The horizontal axis in FIG. 3A identifies the data point of each corresponding measurement value of the signal 300A. The vertical axis corresponds to the optical signal detected by the low-noise photodetector circuit, in arbitrary units. For the detector arrangement used to acquire the signal 300A, the precisely known vacuum wavelength of the ($5S_{1/2}$, F=3→$5P_{3/2}$, F'=(2,3,4)) D2 line of the $^{85}$Rb isotope correspond to the point where the value of the signal 300A reaches a minimum. This point is indicated in FIG. 3A by the reference line 301, which is in the vicinity of data point #501 or so. It should be appreciated that, generally, the precise location of the peak absorption may be between data points. Accordingly, a set of measurement values precisely corresponding to the precisely known 780.2438 nm wavelength of this D2 line of the rubidium vapor cell may be determined by interpolation between data points, if desired. In other implementations, where a higher accuracy may be desired, the F' excited state hyperfine levels may be resolved using known saturated absorption techniques.

Regarding the signal 300B shown in FIG. 3B, the light output from the rubidium cell may pass into a detection channel that includes a filter that is suitable for selecting desired wavelengths in the range of the λ2 wavelengths of a tunable laser 212, and then into a low-noise photodetector circuit that can be used to provide the signal 300B. In one example, the λ2 vacuum wavelengths may be approximately in a range of 794.98+/−0.05 nm, or so. As shown in FIG. 3B, the signal 300B may then include features corresponding to the D1 linear absorption line of the rubidium vapor cell. The acquisition and interpretation of the signal 300B shown in FIG. 3B is analogous to that of the signal 300A, described above. The precisely known vacuum wavelength of 794.9822 nm at the ($5S_{1/2}$, F=3→$5P_{1/2}$, F'=(2,3)) D1 linear absorption line of the $^{85}$Rb isotope corresponds to the point where the value of the signal 300B reaches a minimum. This point is indicated by the reference line 302, which is in the vicinity of data point #500, or so. In other implementations, where a higher accuracy may be desired, the F' excited state hyperfine levels may be resolved using known saturated absorption techniques.

In various implementations, it is practical to obtain successive data points at least every 10 microseconds. The data shown in FIGS. 3A and 3B was obtained at approximately this rate. In various implementations, it may be desirable to arrange the λ1 and λ2 wavelength scans such that data points corresponding to the D1 and D2 wavelengths occur within a short time of each other, for example, at least within 300 microseconds, 100 microseconds, or as little as 10 microseconds, as shown in FIGS. 3A and 3B. In various implementations, it is convenient that the data points corresponding to the D1 and D2 wavelengths or, more generally, wavelengths that are usable to calibrate the reference length $L_R$ as outlined further below, occur within a short time of each other because this makes it less likely that extraneous effects such as vibration, or the like, will disturb the expected relationship between the measurements at these wavelengths.

This may allow the associated signal processing to be simplified, and/or it may increase the robustness of related measurement values and error corrections described further below. In various implementations, the wavelength scan of at least one of the lasers can initiated or controlled automatically, based a feedback signal derived from the timing of at least one of the D1 and D2 wavelength peaks shown in FIGS. 3A and 3B, in order to keep the two transitions concurrent within 300 microseconds, 100 microseconds, or less. The feedback signal may have a large time constant relative to the wavelength scan duration, for example, 0.1- 1.0 seconds, or more.

Figure 4A:
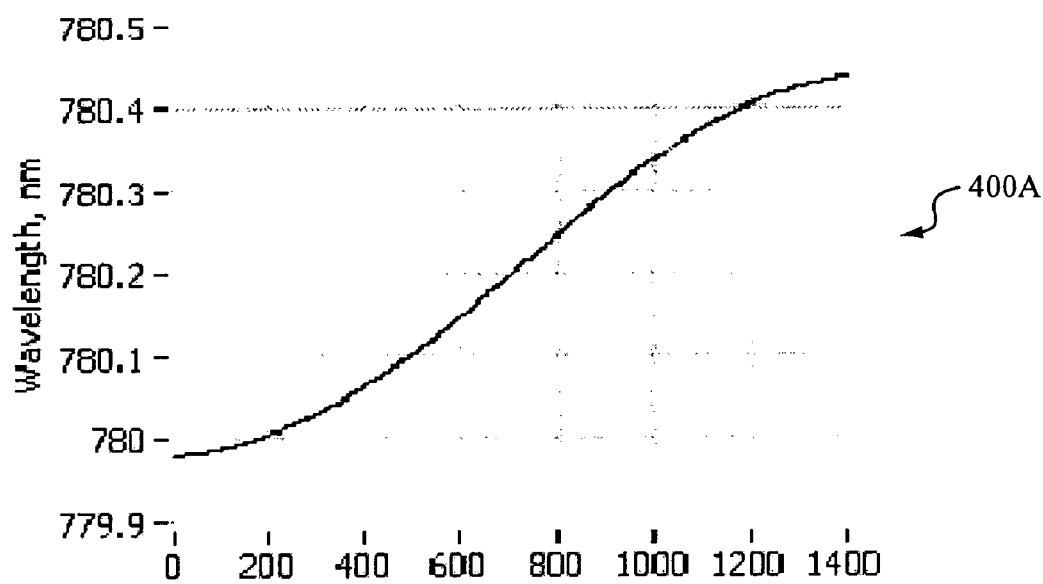
FIGS. 4A and 4B illustrate scanned wavelength curves that include wavelength corrections that are traceable to wavelength reference signals similar to those illustrated in FIG. 3.
Figure 4B:
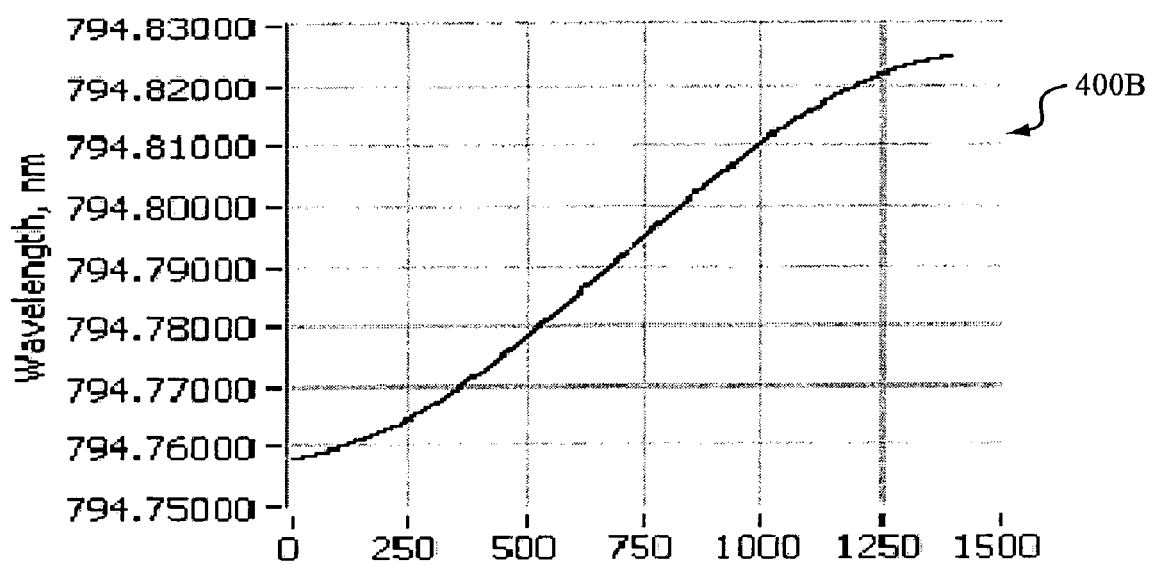

FIGS. 4A and 4B illustrate scanned wavelength curves 400A and 400B, respectively, that include wavelength corrections that are traceable to D2 and D1 wavelength reference signals similar to those illustrated in FIGS. 3A and 3B, respectively. Briefly, the reference path length provided by the reference interferometer may be precisely known or determined based on phase measurements that correspond to the known D2 and D1 reference wavelengths. The D2 and D1 reference wavelengths may include corrections for any variations in the air refractive index, which may be calculated based on continuing measurements of the air pressure, temperature, and humidity surrounding the interferometric measurement system. Furthermore, the precisely known reference path length may be used to provide a phase measurement that may be determined for each data point obtained during a wavelength scan of the tunable laser 110 and a tunable laser 212. Then, the reference path length may be used along with the phase measurement determined for the reference interferometer for each data point, to determine the precise air wavelength of the lasers 110 and 212 that correspond to each data point, if desired. Such precisely determined wavelengths are plotted as the wavelength curves 400A and 400B shown in FIGS. 4A and 4B. It will be appreciated, that such precisely determined wavelengths may then be associated with each data point, and/or the wavelengths and/or related data may be interpolated between data points for the purpose additional analysis and/or precise distance measurement, if desired, as described in greater detail below.

Figure 5:
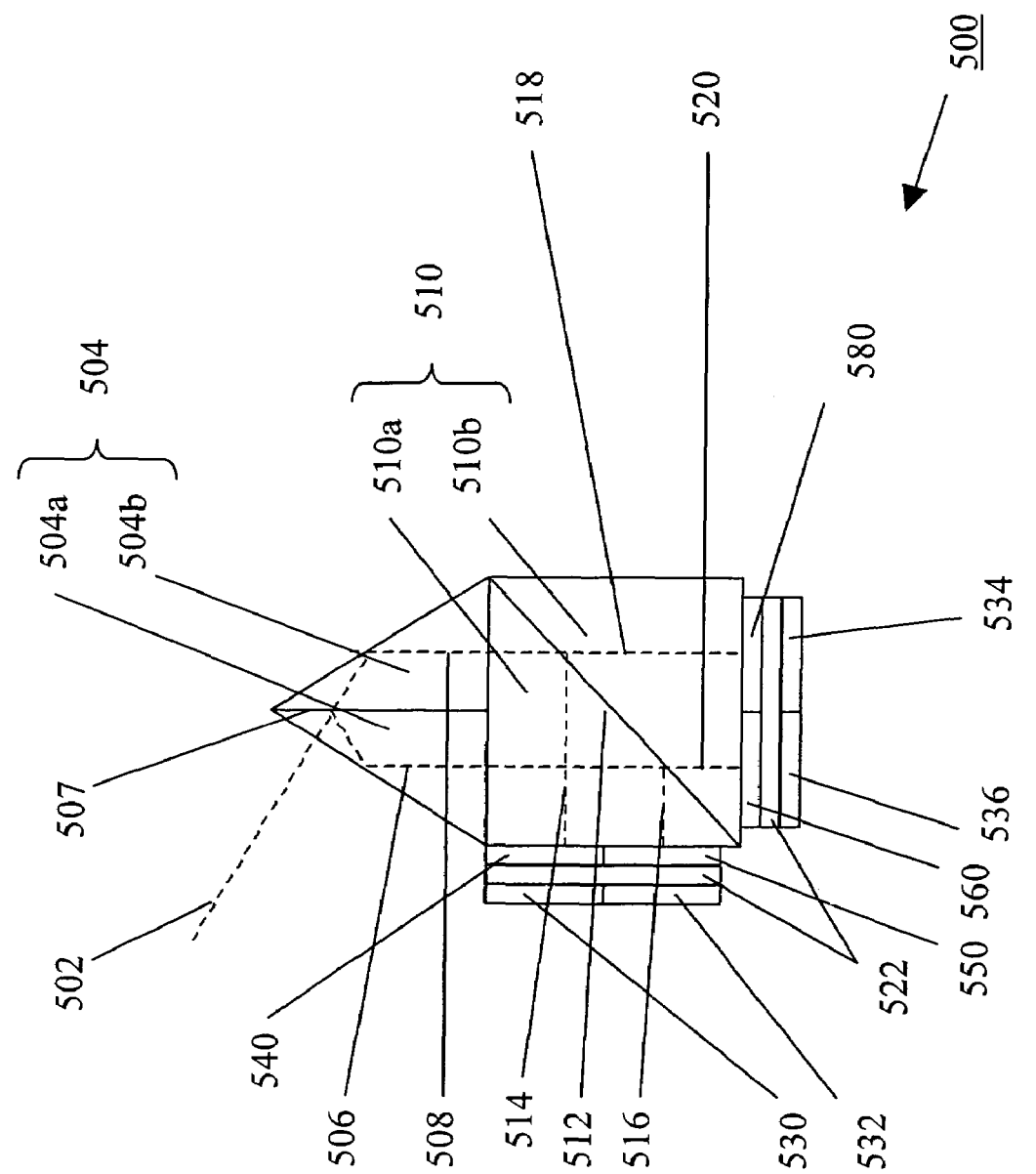
FIG. 5 illustrates an exemplary quadrature signal detector usable in conjunction with the interferometric measurement system of FIG. 1.

FIG. 5 shows an exemplary quadrature detector 500 usable in conjunction with this invention. The basic operation of one implementation of the quadrature detector 500 is described briefly below. Further aspects of the fabrication and operation of the quadrature detector 500 that are important for suppressing various phase errors that may otherwise be imparted to the various quadrature detector signals, as well as various alternative implementations usable in conjunction with this invention, are described in detail in the previously incorporated '403 application.

The quadrature detector 500 may be used for any or all of quadrature detectors 142, 144, 182 and 184 of the interferometric measurement system 100 shown in FIG. 1, if desired. The quadrature detector 500 generates four signals, an in-phase or "zero degree" signal A, an in-phase quadrature or "90 degree" signal B, an out-of-phase or "180 degree" signal C, and an out-of-phase quadrature or "270 degree" signal D. For each respective quadrature detector, these signals can be combined to generate a phase measurement Φ indicative of the optical path length difference between the two arms of the respective interferometer 120 or 160 that includes the respective quadrature detector.

A feature of the quadrature detector 500 is that each signal is taken from an input beam 502 as a whole, and therefore, various undesirable effects which may arise in a particular portion of the input beam 502 may affect each detected signal similarly. Therefore, the associated "common-mode" error components may in some cases be reduced or eliminated by appropriate signal processing, if desired, as described in greater detail below.

As shown in FIG. 5, the quadrature detector 500 may include a 30-60-90 prism 504a and a 30-60-90 prism 504b, which may be disposed on top of a 50/50 non-polarizing beam splitter 510. The two 30-60-90 prisms 504 may abut at an interface 507 that splits the input beam 502 into two beams 506 and 508. The orientation of the orthogonally polarized components of the input beam 502 relative to the various surfaces of the quadrature detector 500 may be important to control. Such considerations are described in detail in the previously incorporated '403 application. The interface 507 may be coated to impart a zero degree phase shift to the light of the transmitted beam 508 and a 180 degree phase shift to the reflected beam 506. The beam 506 which is reflected at the interface 507 may then be reflected at an air-prism interface by total internal reflection and may be directed into beam splitter 510. The other beam 508 which was transmitted at the interface 507 may also be reflected at an air-prism interface and directed into the beam splitter 510.

The beam splitter 510 may then split the two input beams 506 and 508 into four output beams as shown in FIG. 5, at a surface 512 of the beam splitter 510. Two of the output beams 514 and 516 may be reflected at the beam splitter surface 512, and two of the output beams 518 and 520 may be transmitted by surface 512. Two of the four beams, 514 and 518, respectively, may pass through quarter wave plates 540 and 580, respectively. Quarter wave plates 540 and 580 may have orthogonal fast and slow axes that are aligned with the orthogonally polarized components (that is, the reference and object components) of the beams 514 and 518, so that only one of the orthogonally polarized components of the beams 514 and 518 is retarded. Therefore, the beams 514 and 518 through the quadrature detector 500 may have a phase shift corresponding to ¼ of a wavelength imposed upon one of their orthogonally polarized components.

The upper reflected beam 514 may traverse quarter wave plate 540, which may retard the phase of one orthogonally polarized component of beam 514 by 90 degrees. The beam 514 then impinges on a polarizer 522 having a polarization direction that is nominally oriented at a 45 degree angle to the orthogonally polarized components, before arriving at the detector 530. The polarizer 522 and the quarter wave plate 540 may combine to interfere the light from the two arms of the particular interferometer (that is, the interferometer 120 or the interferometer 160), with the light from one of the arms of the interferometer retarded by 90 degrees, in order to provide the "90 degree" quadrature signal. Therefore, detector 530 may measure the "90 degree" quadrature signal, or signal B.

The lower reflected beam 516 traverses quarter wave plate 550, which retards the phase of one orthogonally polarized component of beam 516 by 90 degrees, before impinging on the polarizer 522 and a detector 532. Therefore, when the interface 507 imparts a 180 degree phase shift to the entire reflected beam 506, the polarizer 522 and the quarter wave plate 550 combine to interfere the light from the two arms of the particular interferometer, with the light from both of arms of the interferometer shifted by 180 degrees, and the light from one of the arms retarded by an additional 90 degrees, in order to provide the "270 degree" quadrature signal. Therefore, detector 532 may measure the "270 degree" quadrature signal, or signal D.

The transmitted beam 518 traverses a glass spacer 580. The glass spacer 580 does not retarde either of the two orthogonally polarized components, but reproduces the nominal optical path length of the quarter wave plates 540 and 550. The beam 518 then impinges on a polarizer 522 having a polarization direction that is nominally oriented at a 45 degree angle to the orthogonally polarized components, before arriving at a detector 534. The polarizer 522 and the glass spacer 580 combine to interfere the light from the two arms of the particular interferometer, in order to provide the "0 degree" quadrature signal. Therefore, detector 534 may measure the "0 degree" quadrature signal, or signal A.

The transmitted beam 520 traverses a glass spacer 560 that is similar to the glass spacer 580. The beam 518 then impinges on the polarizer 522 impinging on a detector 536. Therefore, when the interface 507 imparts a 180 degree phase shift to the entire reflected beam 506, the polarizer 522 and the glass spacer 560 combine to interfere the light from the two arms of the host interferometer, with the light from both of arms of the interferometer shifted by 180 degrees, in order to provide the "180 degree" quadrature signal. Therefore, detector 536 may measure the "180 degree" quadrature signal, or signal C.

Figure 6:
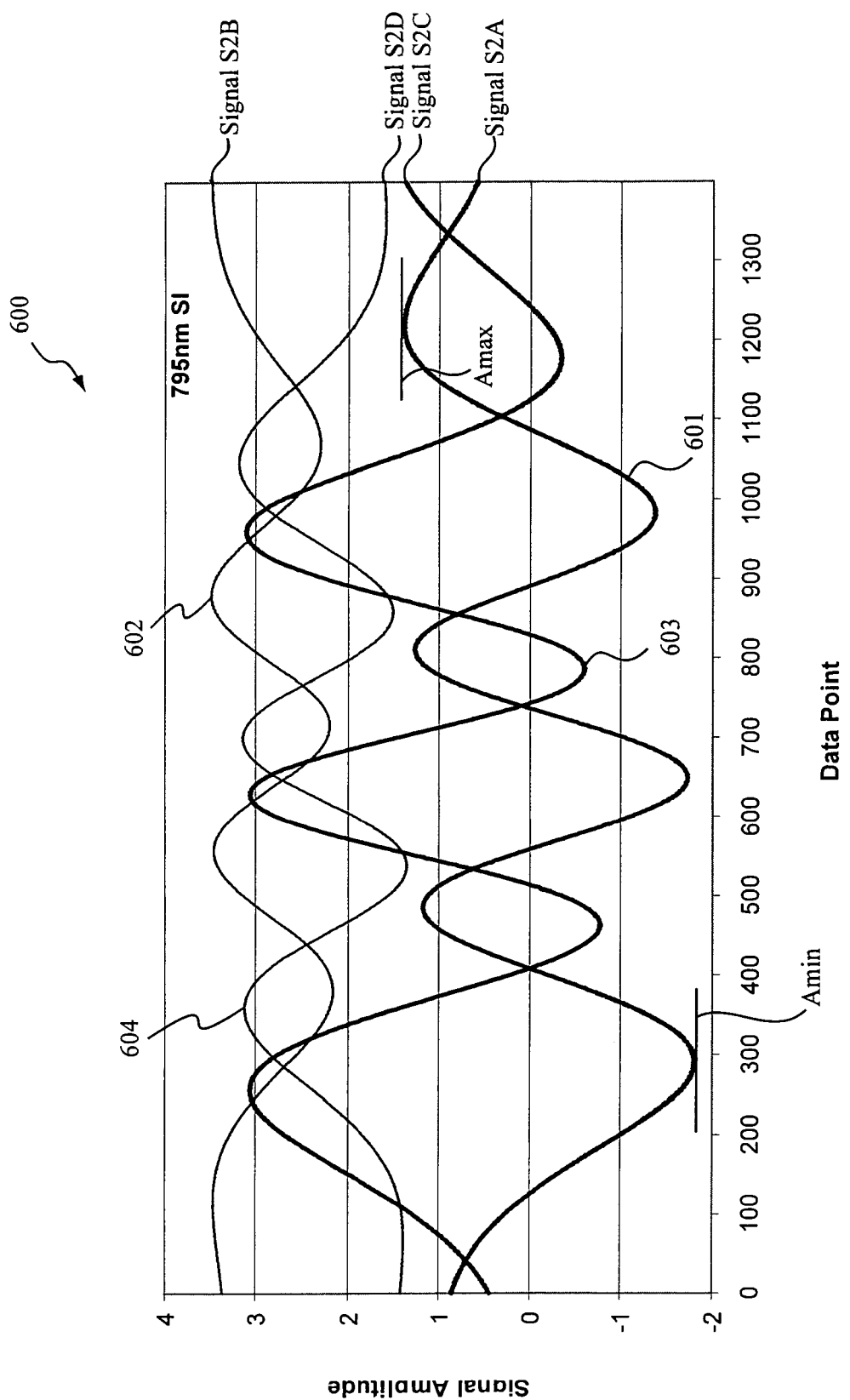
FIG. 6 is a diagram illustrating a first exemplary set of four quadrature detector signals that may be obtained for a first scanned wavelength range of the interferometric measurement system illustrated in FIG. 1.

FIG. 6 is a diagram 600 illustrating a first exemplary set of four quadrature detector signals that may be obtained for a scanned wavelength range of tunable laser used by an interferometric measurement system according to this invention. In the example shown in the diagram 600, the wavelength range may be a λ2 wavelength range approximately in a range of 794.8+/−0.05 nm, or so.

The diagram 600 includes a four quadrature signals 601-604, respectively, which may be acquired in a manner similar to that previously described for the signals A-D, respectively, with reference to FIG. 5. The horizontal axis in FIG. 6 identifies the data point of each corresponding measurement value of the signals 601-604. Various measurement principles associated with such data points have been previously discussed with reference to FIGS. 3A and 3B. The vertical axis corresponds to the optical signals detected by low-noise photodetector circuits in the quadrature detector used to acquire the signals 601-604, in arbitrary units.

Such signals may be acquired by a quadrature detector such as the λ2 quadrature detector 184 of the sample interferometer 160 shown in FIG. 1. Thus, for purposes of explanation, the signals 601-604 are also referred to as S2A through S2D, where "S" stands for the sample interferometer, "2" stands for signals that arise from λ2, and A-D stand for the 0 degree-270 degree quadrature signals, as previously indicated. The use of such symbols continues below. In addition, "R" stands for reference interferometer, "1" stands for signals that arise from λ1, for example in one of the λ1 quadrature detectors 142 or 182, and so on.

It is apparent in the diagram 600, that there are error components present in the various signals S2A through S2D. For example, it is apparent that the each of the signals includes a significant DC offset. Furthermore, the nominal or "global" peak-to-peak) signal amplitude of each signal is different. The global peak-to-peak signal amplitude may be represented by the difference between the maximum signal value throughout the scan and the minimum signal value throughout the scan, for example, the difference between the values Amax and Amin of the signal S2A shown in FIG. 6. Furthermore, it is apparent that the phases of the various signals relative to one another along the horizontal axis are not ideal. For example, the pair of signals S2A and S2C are clearly not 180 degrees out of phase, as would ideally be expected. For accurate distance measurements, it is desirable to eliminate or correct as many of these error components as possible, as described in greater detail below.

Figure 7A:
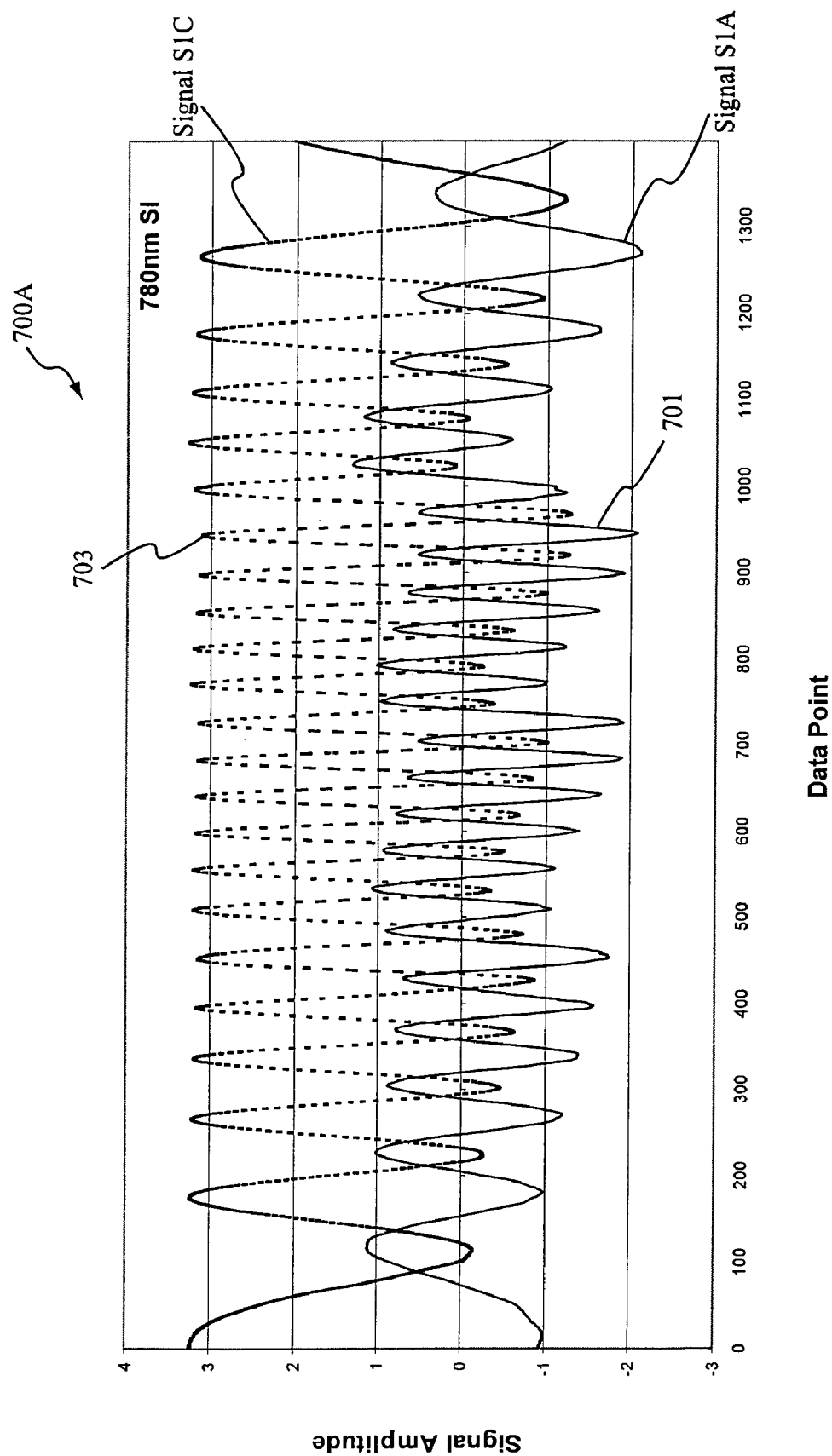
FIGS. 7A and 7B are diagrams illustrating a first and second pair of signals of a second exemplary set of four quadrature detector signals that may be obtained for a second scanned wavelength range of the interferometric measurement system illustrated in FIG. 1.
Figure 7B:
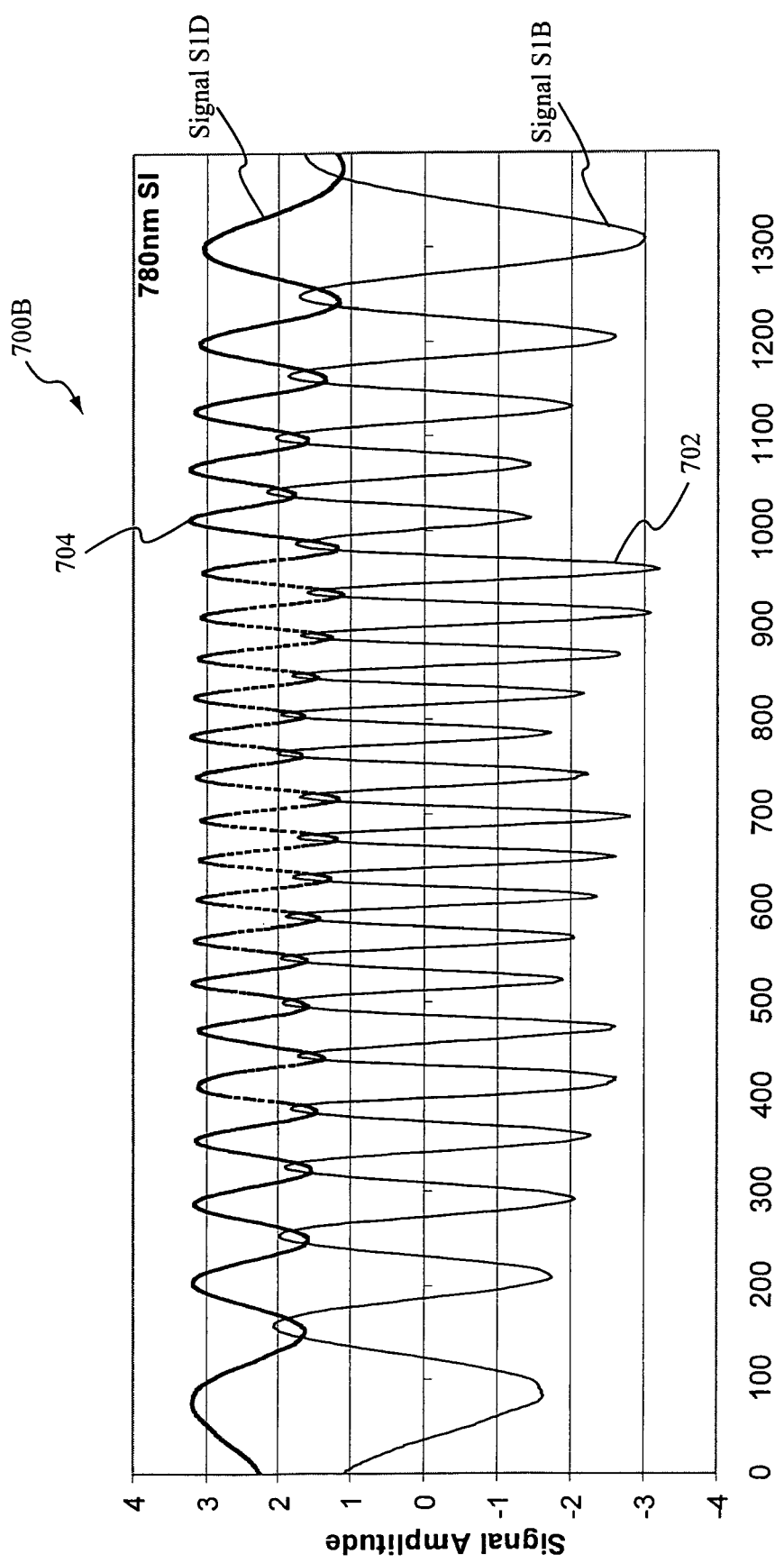

FIGS. 7A and 7B show diagrams 700A and 700B, respectively, that together illustrate a second exemplary set of four quadrature detector signals that may be obtained for a scanned wavelength range of tunable laser used by an interferometric measurement system according to this invention. In the example shown in the diagrams 700A and 700B, the wavelength range may be a λ1 wavelength range approximately in a range of 780.2+/−0.5 nm, or so.

As previously outlined, any of the measurement signals disclosed herein may be provided in a simultaneously measured set of signals, acquired such that each signal in the set corresponds to the same instantaneous state of the interferometric measurement system as the tunable laser wavelength(s) is/are scanned, for example. Each such set of signals corresponds to a unique "data point". The horizontal axis in FIGS. 7A and 7B identify the data point of each corresponding measurement value of the signals 701-704. For purposes of explanation, the data points of the diagrams 700A and 700B may be considered comparable to the data points shown in FIGS. 4A, 4B, and FIG. 6, for example.

Together, the signals of the diagrams 700A and 700B are analogous to the signals of the diagram 600, described above. The signals are illustrated in separate diagrams 700A and 700B only for clarity, because the greater number of cycles associated with the exemplary λ1 wavelength range makes it difficult to identify and interpret the signals when they are plotted in a single diagram. The horizontal axes in FIGS. 7A and 7B identify the same data points as those identified in FIG. 6, each corresponding to measurement values of the signals 701-704. The vertical axes correspond to the optical signals detected by low-noise photodetector circuits in the quadrature detector used to acquire the signals 701-704, in arbitrary units that are the same as the arbitrary units used for the vertical axis in FIG. 6. Thus, the signals shown in FIGS. 7A and 7B are properly represented in comparison to the signals shown in FIG. 6, at each data point.

The signals 701-704 may be acquired by a quadrature detector such as the λ1 quadrature detector 182 of the sample interferometer 160 shown in FIG. 1. Thus, for purposes of explanation, the signals 701-704 are also referred to as S1A through S1D, using a previously described symbol convention. It is apparent in the diagrams 700A and 700B that there are error components present in the various signals S1A through S1D, similar to those previously described with reference to the diagram 600. As previously indicated, for accurate distance measurements, it is desirable to eliminate or correct as many of these error components as possible.

Regarding error component correction, for four related quadrature signals A-D related as outline above, the signals can be combined according to the following equation:

$$\Phi = \tan^{-1}\left(\frac{A-C}{B-D}\right) \quad (4)$$

to generate a phase measurement Φ indicative of the optical path length difference between the two arms of the host interferometer that includes the respective quadrature detector used to determine the signals. In the differential signals (A-C) and (B-D), the common-mode "DC offset" errors are reduced or eliminated to a first order. Furthermore, taking the ratio (A-C)/(B-D) may also reduce or eliminate the effect of variations in the global amplitude of the signals to a first order, for example, variations such as those produced by a change in a laser source intensity, or the like. It is convenient to establish the term "error component correction". Using this term, we may describe an operation corresponding to Eq. (4) as providing a first-order DC-offset error component correction and a first-order amplitude error component correction.

Alternatively to the arctangent function shown in Eq. (4) above, the two-argument function atan2(arg1, arg2) may be used. The atan2 function, in effect, recognizes the respective signs of the numerator and denominator shown in Eq. (4), and may thus have the advantage of determining the quadrant of the resulting angle based on the two arguments, so that it can return a value that is unique over a complete phase cycle.

The results of an operation according to Eq. (4) may be further improved if the raw signals, such as the signals shown in FIGS. 6, 7A and 7B, are normalized at each data point using an applicable power detector signal, for example, a power detector signal determined according to any of the power detector arrangements previously described herein. With reference to the exemplary power detector arrangement shown for the sample interferometer 160 in FIG. 1, for example, at each data point a power amplitude measurement acquired from the optical power detector 273 may be used to normalize the measurements for the signals S1A through S1D provided by the λ1 quadrature detector 182. Similarly, a measurement acquired from the optical power detector 272 may be used to normalize the measurement for the signals S2A through S2D provided by the λ2 quadrature detector 184, for example by dividing the quadrature signal measurements at each respective data point by a factor proportional to the power measurement at each respective data point.

Figure 8:
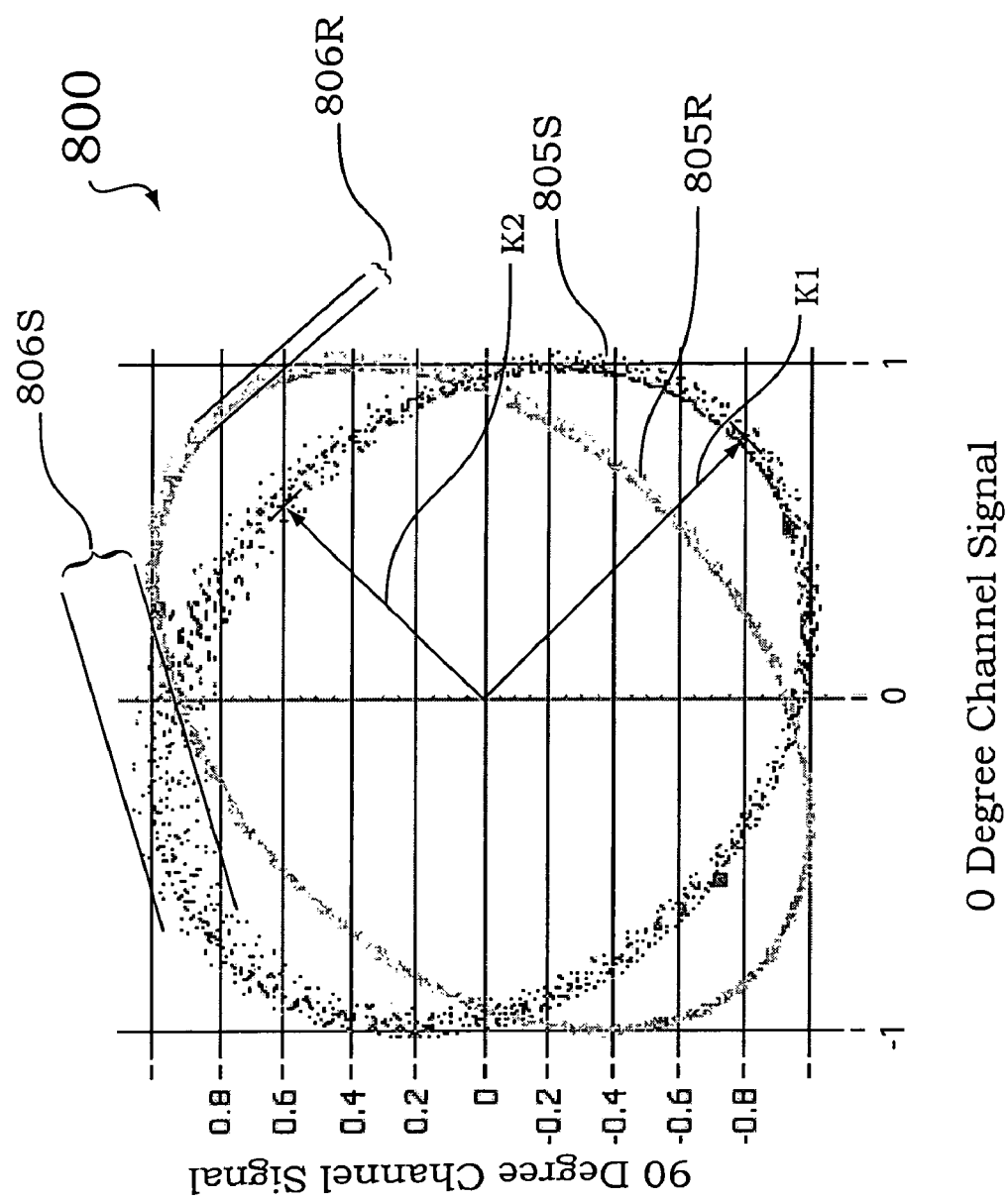
FIG. 8 is a diagram illustrating two exemplary lissajous plots respectively corresponding to measurement signals from a sample interferometer and a reference interferometer, for a first combination of measurement signal error component corrections.

FIG. 8 is a diagram illustrating two exemplary lissajous plots 805S and 805R. It is known that quadrature type signals can be displayed or plotted together as a lissajous plot in the manner shown in FIG. 8, to more easily and intuitively recognize certain errors and relationships between the signals. Thus, a lissajous plot representation is used in FIGS. 8, 11, and 14, for purposes of explanation. However, it will be recognized that this is for convenient explanation only, and the benefits provided by the underlying principles disclosed herein need not require the actual construction or display of a lissajous plot, but may be applied in any convenient form that provides similar benefits according to the teachings herein.

The plot 805S corresponds to the sample interferometer measurements shown in FIGS. 7A and 7B, after it has been corrected according to the error component corrections outlined above, as well as additional global corrections outlined below. That is, for each data point, the quadrature signal values shown in FIGS. 7A and 7B may have been normalized based on simultaneously acquired power measurement values provided by an arrangement such as that shown in FIG. 1, as a first error component correction, primarily for amplitude errors. Then, the respective quadrature signal DC offsets may be established at each data point as [(S1A'+S1C')/2] and [(S1B+S1D')/2], respectively, and the results may be respectively averaged for all data points, to provide respective global DC-offset values for the respective quadrature signals. Then, for each respective quadrature signal, the applicable respective global DC-offset value may be subtracted from each respective quadrature signal for each data point as a first error component correction for DC-offset. Then, for each of resulting normalized and DC-offset corrected quadrature signal, which we may refer to as the corrected quadrature signals S1A", S1C", S1B" and S1D", a respective global peak-to-peak amplitude value is determined as [(Amax−Amin)/2], based on Amax and Amin points for each respective signal that are analogous to the points Amax and Amin previously described with reference to FIG. 6. Then, for each data point of each of the respective quadrature signals S1A", S1C", S1B" and S1D", the signals are divided by their respective global peak-to-peak amplitude value, to provide further-corrected quadrature signals S1A''', S1C''', S1B''' and S1D'''.

Then, for each data point of the plot 805S shown in FIG. 8, the value along the horizontal axis (or x-axis) is determined as a value proportional to [(S1A''')-(S1C''')], and the value along the vertical axis (or y-axis) is a determined as a value proportional to [(S1B''')-(S1D''')]. Accordingly, for the data points of the plot 805S, the phase measurement Φ shown in Eq. (4) corresponds in principle to the angle of a data point along a clockwise direction relative to the direction of the positive y-axis in FIG. 8. Of course, the various axes and values could be rearranged to provide a more conventional phase angle depiction, if desired.

The plot 805R corresponds to λ1 measurement data acquired for a reference interferometer arrangement similar to the reference interferometer 120 shown in FIG. 1, where the data is acquired at each data point simultaneously with the data corresponding to the plot 805S, and in a substantially similar manner using the λ1 optical power detector and the λ1 quadrature detector of the reference interferometer. The data points of the plot 805R have been determined and corrected, in manner analogous to that previously described with reference to the data points of the plot 805S. Thus, for each data point of the plot 805R shown in FIG. 8, the value along the horizontal axis (or x-axis) is determined as a value proportional to [(R1A''')-(R1C''')], and the value along the vertical axis (or y-axis) is a determined as a value proportional to [(R1B''')-(R1D''')]. Accordingly, for the data points of the plot 805R, the phase measurement Φ shown in Eq. (4) corresponds in principle to the angle of a data point along a clockwise direction relative to the direction of the positive y-axis in FIG. 8.

All of the data plotted in FIG. 8 was experimentally determined using an interferometric measurement system substantially similar to that described with reference to FIG. 1. Despite the foregoing corrections, the ellipsoid shape of the plot 805S in FIG. 8 indicates that there is a global phase error between the [(S1A''')-(S1C''')] and [(S1B''')-(S1D''')] quadrature components of that plot. That is, the acquired quadrature signal components are not actually at the ideally-expected and/or desired 90 degree phase difference intended to be introduced by a quadrature detector such as that outlined with reference to FIG. 5. Generally, the greater the difference between the dimensions K1 and K2 shown in FIG. 8, the greater the global quadrature phase error, also referred to as the orthogonality error. A similar interpretation holds for the ellipsoid shape of the plot 805R. Correction of orthogonality errors is discussed further below.

Furthermore, despite the foregoing corrections, the scatter of the plotted sample interferometer values in FIG. 8, emphasized by the scatter indicator 806S for the plot 805S, indicates that residual amplitude errors and/or DC-offset errors, as well as other smaller error sources, may remain in the [(S1A''')-(S1C''')] and [(S1B''')-(S1D''')] quadrature components of the plot 805S. A similar interpretation holds for the scatter of the plot 805R, as emphasized by the scatter indicator 806R for the plot 805R. However, as may be expected, due to the more controlled and stable configuration of the reference interferometer in comparison to the sample interferometer, the scatter 806R and the related errors are substantially smaller for the measurements of the reference interferometer in comparison to the scatter 805R and the related errors of the sample interferometer. Thus, further corrections to the remaining amplitude and/or DC-offset errors, as well as other smaller error sources, of the sample interferometer may be more effective at improving the overall distance measurement robustness and/or accuracy of an interferometric measurement system such as that shown in FIG. 1, in comparison to further corrections to the remaining amplitude and/or offset errors of the reference interferometer.

Referring now to the exemplary interferometric measurement system 100 shown in FIG. 1 for purposes of explanation, as previously outlined, the measurement distance to the surface of sample 166 may be determined to a first "coarse" resolution over an absolute range by multiplying the reference path length of the reference interferometer 120 by a ratio formed by dividing a difference between respective optical phase measurements at respective wavelengths in the sample interferometer by a difference between respective optical phase measurements at respective wavelengths in the reference interferometer. The ratio of phase differences between the sample and reference interferometers is nominally proportional to the ratio of the measurement distance to the surface of sample 166 in the sample interferometer 160 to the reference length in the reference interferometer 120.

Figure 9:
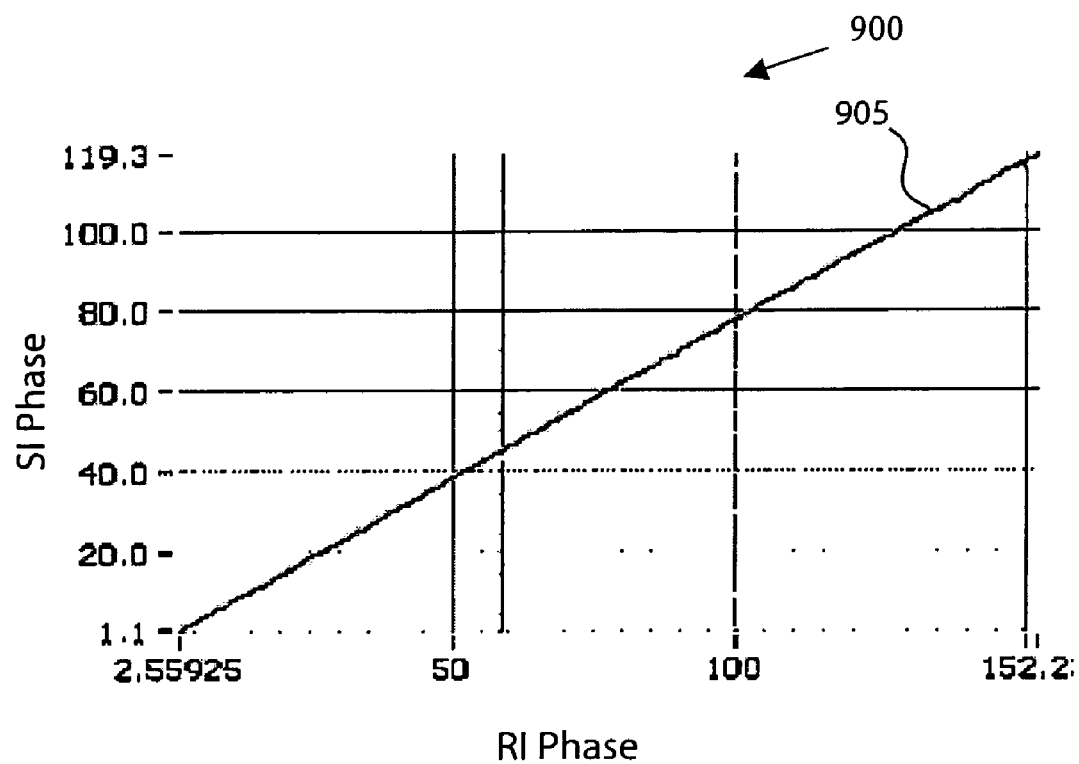
FIG. 9 is a diagram illustrating data plotted to show an exemplary relationship between the phase change of a sample interferometer and the phase change of a reference interferometer that may be obtained for a scanned wavelength range of the interferometric measurement system illustrated in FIG. 1.

FIG. 9 shows is a diagram 900 illustrating a plot 905 showing the relationship between phase measurements from a sample interferometer and phase measurements from a reference interferometer, as may be obtained for a λ1 scanned wavelength range from an interferometric measurement system such as that illustrated in FIG. 1 and described above. At each data point of the plot 905, the signals used to determine the reference interferometer phase measurement, shown along the horizontal axis in radians, were acquired simultaneously with the signals used to determine the sample interferometer phase measurement, shown along the horizontal axis in radians. In particular, the data of the plot 905 in FIG. 9 may be based on the corrected sample interferometer quadrature signals [(S1A''')-(S1C''')] and [(S1B''')-(S1D''')] previously described and plotted as the plot 805S in FIG. 8, and the corresponding corrected reference interferometer quadrature signals [(R1A''')-(R1C''')] and [(R1B''')-(R1D''')] previously described and plotted as the plot 805R in FIG. 8. The corrected phase measurements corresponding to the various data points of the quadrature signals have been "unwrapped" to form the plot 905. That is, although each corrected phase measurement may initially be ambiguous with regard to which particular "wavelength cycle" corresponds to the phase measurement, because the order of the data points is known, and it is furthermore known that the wavelength is increasing or decreasing for successive data points, it may be recognized when 2π radians should be added to, or subtracted from, a phase measurement to create the monotonically increasing phase measurements of the plot 905.

It should be appreciated that determining the slope of the plot 905 may provide one method of determining a ratio formed by dividing a difference between respective optical phase measurements at respective wavelengths in the sample interferometer by a difference between respective optical phase measurements at respective wavelengths in the reference interferometer. Thus, the slope of the plot 905 may be used to multiply the reference length of the reference interferometer 120, for example, in order to determine the measurement distance to the sample 166 in the sample interferometer 160 to coarse resolution over an absolute range, as previously outlined. That is, excluding compensation of certain dynamic errors such as vibration, the coarse measurement distance $z_c$ may be determined as:

$$z_{coarse} = \frac{\Delta\phi_{S,\lambda1}}{\Delta\phi_{R,\lambda1}} L_R = \frac{\phi_{S,\lambda1,dp\ upper} - \phi_{S,\lambda1,dp\ lower}}{\phi_{R,\lambda1,dp\ upper} - \phi_{R,\lambda1,dp\ lower}} L_R - m*L_R \quad (5)$$

where the symbol φ refers to an "unwrapped" phase measurement value, $L_R$ is the reference length provided by the reference interferometer, dp upper and dp lower refer to a selected "upper" and "lower" data points that are spaced apart along the plot 905 (corresponding to different underlying wavelengths), and m is the estimated slope of the plot 905.

It should be appreciated that because the slope of the plot 905 may be determined from a best-fit line that is fitted to a large number of data points, on the order of 1000-2000 data points during a wavelength scan, for example, the determined slope or ratio may be highly accurate. Thus, the coarse resolution and accuracy obtained by the methods outlined above may be at a refined level compared to various prior art techniques for coarse absolute measurement, improving the range-to-resolution figure of merit of the interferometric measurement systems and methods according to this invention, compared to various prior art systems and methods.

Figure 10:
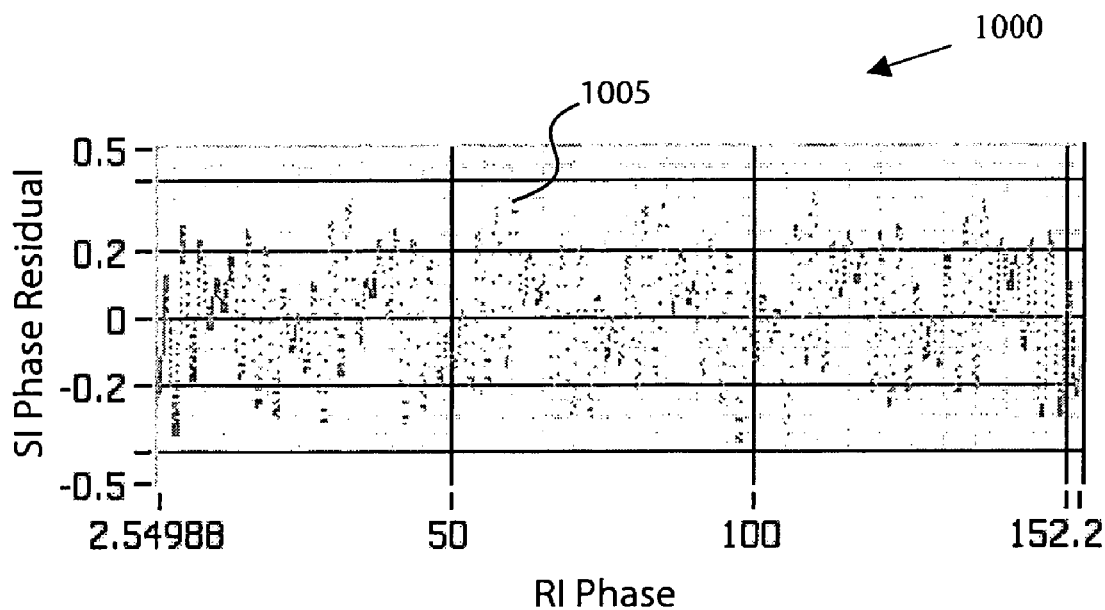
FIG. 10 is a diagram illustrating an exemplary set of residual errors that may be displayed by the data of the exemplary relationship illustrated in FIG. 9, using the first combination of measurement signal error component corrections reflected in FIG. 8.

FIG. 10 is a diagram 1000 illustrating a plot 1005 of the residual errors, that is the difference between the sample interferometer phase measurements and a best-fit line for the plot 905 shown in FIG. 9. As shown in FIG. 10, the residual phase errors may be on the order of 0.75 radians peak-to-peak. In order to further improve the coarse resolution and accuracy, and improve the range-to-resolution figure of merit, it may be desirable to further reduce the contributions to the phase error residuals shown in the plot 905.

Figure 11:
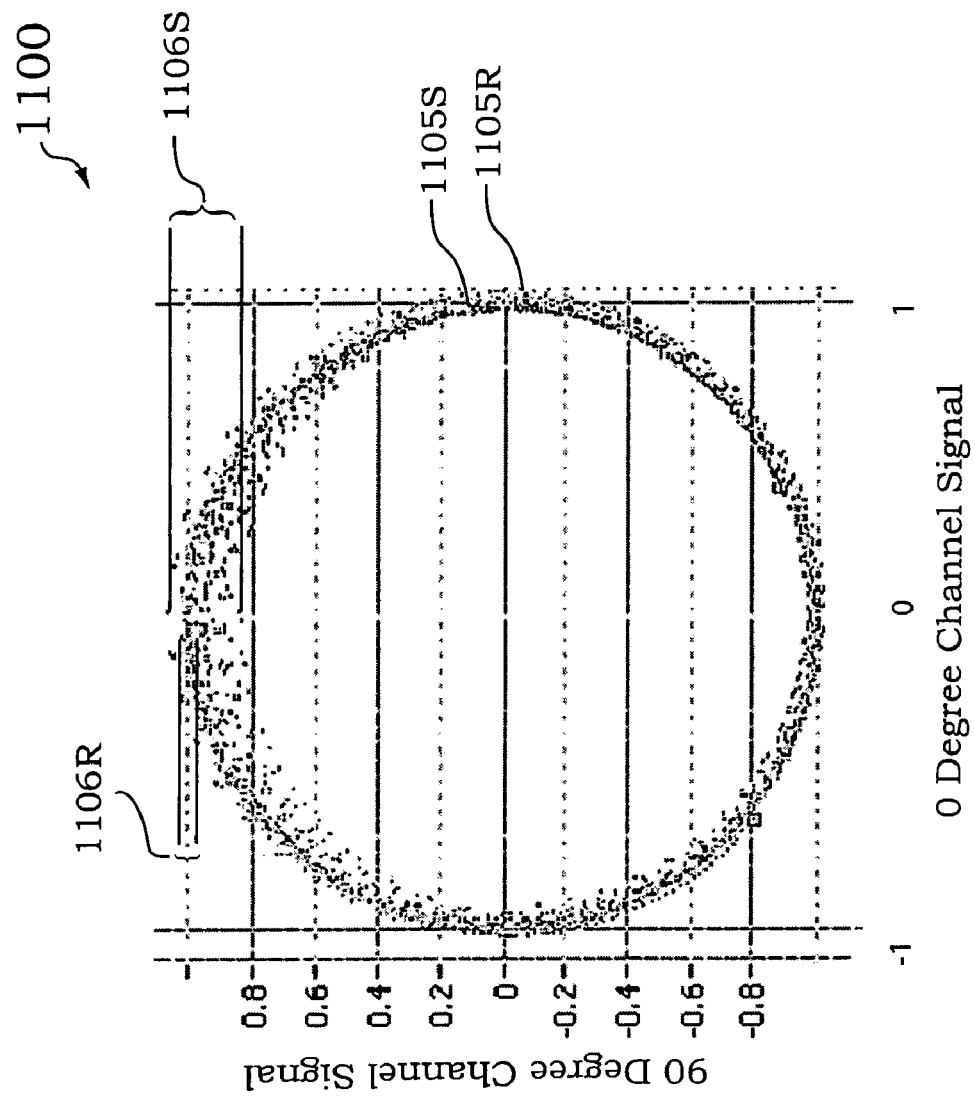
FIG. 11 is a diagram illustrating two exemplary lissajous plots respectively corresponding to measurement signals from a sample interferometer and a reference interferometer, for a second combination of measurement signal error component corrections.

FIG. 11 shows a diagram 1100 that includes a plot 1105S and a plot 1105R, which overlay one another. The plots 1105S and 1105R, respectively, may be based on the same data as that included in the plots 805S and 805R, respectively, of the diagram 800 shown FIG. 8, but the data may also include an additional correction component, to correct the global phase errors previously discussed with reference to FIG. 8.

As previously discussed, for the plot 805S, the greater the difference between the dimensions K1 and K2 shown in FIG. 8, the greater the global quadrature phase error, also referred to as the orthogonality error. A similar interpretation holds for the ellipsoid shape of the plot 805R. According to one exemplary method, to correct the global phase error for either of the plots 805S or 805R, an ellipse may be best-fit to the data points of the plot, according to known methods. The major and minor axis dimensions, such as K1 and K2 shown in FIG. 8, may be determined from the best-fit ellipse. The orthogonality error ε for a given plot may then be determined as:

$$\varepsilon = 2\tan^{-1}\left(\frac{K-1}{K+1}\right) \quad (6)$$

where K=[K1/K2].

Then, for each data point of the plot 1105S shown in FIG. 11, the value along the vertical axis (or y-axis) may be determined as a value proportional to $$\frac{[S1B''' - S1D'''] + [S1A''' - S1C''']*\sin\varepsilon}{\cos\varepsilon} \quad (7)$$

where the value for ε corresponds to that determined for the plot 805S, and the value along the horizontal axis (or x-axis) may be determined as a value proportional to [(S1A''')-(S1C''')]. Similarly, for each data point of the plot 1105R shown in FIG. 11, the value along the vertical axis may be determined as a value proportional to $$\frac{[R1B''' - R1D'''] + [R1A''' - R1C''']*\sin\varepsilon}{\cos\varepsilon} \quad (8)$$

where the value for ε may correspond to that determined for the plot 805R, and the value along the horizontal may be determined as a value proportional to [(R1A''')-(R1C''')].

As a result of the global phase error correction outlined above, the circular shape of the plots 1105S and 1105R, which may overlay one another in FIG. 11, indicates that the global phase error may have been substantially eliminated. That is, the corrected quadrature signal components plotted in FIG. 11 are approximately at the ideally-expected 90 degree phase difference. However, despite the foregoing additional global phase error component correction, the scatter of the plotted values in FIG. 11, emphasized by the scatter indicator 1106S for the plot 1105S and the scatter indicator 1106R for the plot 1105R, indicates that residual amplitude errors and/or DC-offset errors remain, as well as other smaller errors, may remain in the quadrature components of the plots 1105S and 1105R.

Figure 12:
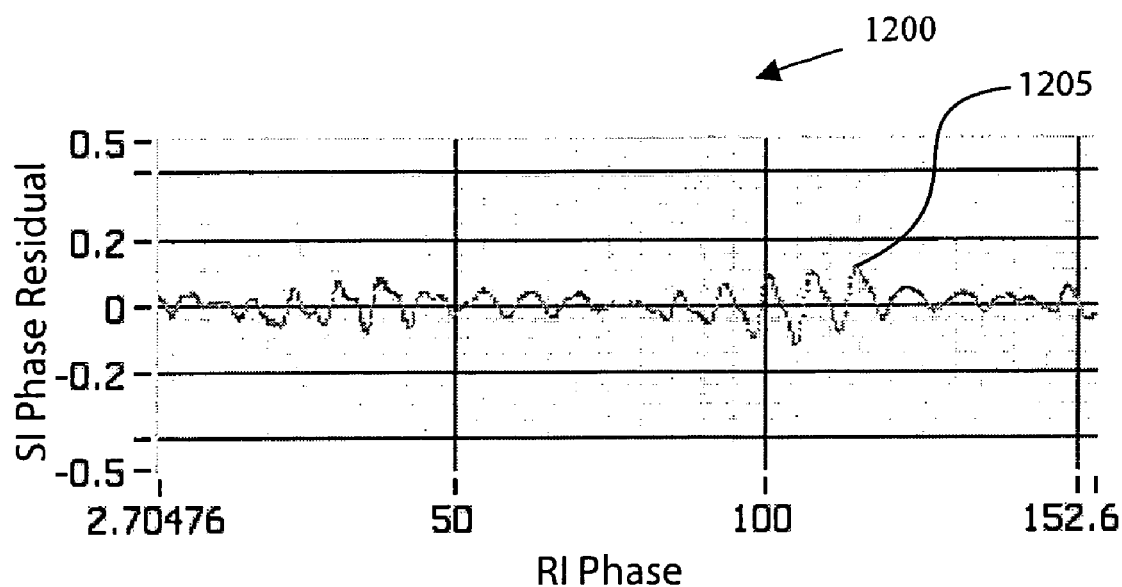
FIG. 12 is a diagram illustrating an exemplary set of residual errors that may be displayed by the data of the exemplary relationship illustrated in FIG. 9, using the second combination of measurement signal error component corrections reflected in FIG. 11.

FIG. 12 is a diagram 1200 that includes a residual plot 1205 that is based on the same data as that included in the residual plot 1005 of the diagram 1000 shown FIG. 10, but the data include the additional correction for global phase errors, as previously discussed with reference to FIG. 11. As shown in FIG. 12, the residual phase errors of the sample interferometer phase measurements compared to the best-fit line may be on the order of 0.25 radians peak-to-peak, and may appear to include primarily a periodic error component. In order to further improve the coarse resolution and accuracy, and improve the range-to-resolution figure of merit, it may be desirable to further reduce the contributions to the phase error residuals shown in the plot 1105. It should be appreciated that the peak-to-peak value for the residual phase errors of the plot 1105 may be related to the scatter indicated by the scatter indicators 1106S and 1106R of the diagram 1100. As previously outlined with reference to the scatter indicators 806S and 806R of the diagram 800 shown in FIG. 8, such scatter may be indicative of residual amplitude and DC-offset errors.

Figure 13:
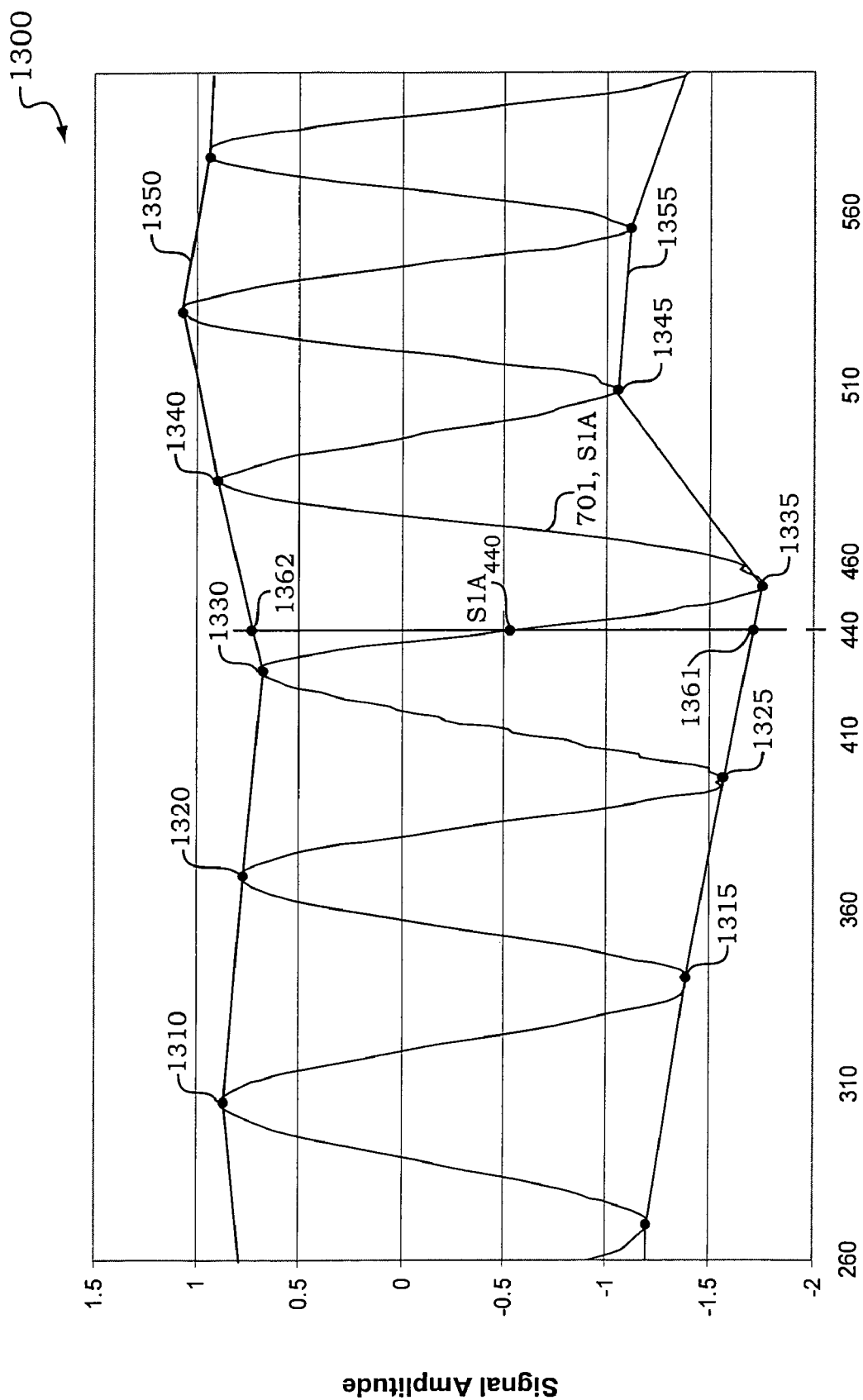
FIG. 13 is a diagram illustrating an exemplary quadrature detector signal along with one exemplary method of performing local amplitude and offset error compensation.

FIG. 13 is a diagram illustrating an expanded portion of the quadrature detector signal 701 shown in FIG. 7A, along with one exemplary method of performing local amplitude and offset error correction. It will be appreciated that the error component corrections previously outlined with reference to the plots 805S and 805R shown in FIG. 8, may have emphasized various global amplitude and offset error corrections. One exemplary method for providing additional, local, amplitude and DC-offset error component corrections is described here. The use of the quadrature detector signal 701 is exemplary only. More generally, the method, may be applied to any of the quadrature signals described above, either in the form of raw quadrature signal data, or in the form of corrected quadrature signal data. Initially the data points of the quadrature signal may be analyzed to determine the local maxima and minima among the data points. This operation is exemplified by the local maxima 1310-1340 and the local minima 1315-1345 identified in FIG. 13. Then for each data point dp, such as the exemplary data point 440 shown in FIG. 13, an interpolated local maximum Omax dp may be determined by linear interpolation between the adjacent local maxima. For example, in FIG. 13, at the data point 440 the interpolated local maximum 1362 can be determined between the adjacent local maxima 1330 and 1340. Similarly, for each data point, an interpolated local minimum Omin dp may be determined between the adjacent local minima, as exemplified by the interpolated local minimum 1361 determined between the adjacent local minima 1325 and 1335, for the data point 440.

Next, a respective quadrature signal amplitude Amp dp may be established at each data point dp as Amp dp=[(Omax dp−Omin dp)/2], respectively, and each respective data point may be locally corrected for signal amplitude variations by dividing the quadrature signal data value at each respective data point by a factor proportional to Amp dp, that is, (k*Amp dp) at that respective data point, for example, by dividing the quadrature signal data value $SA1_{440}$ at the data point 440 shown in FIG. 13, by (k*Amp 440). By doing this at each point, a new set of locally amplitude-corrected quadrature signal data may be provided. The identity dp of the data points corresponding to the local minima and maxima and the interpolated maxima and minima will be unchanged, but the interpolated maxima and minima will now have amplitude-corrected values as outlined above, which we may designate Omin' dp and Omax' dp.

Next, a respective quadrature signal DC-offset DC dp may be established at each amplitude-corrected data point dp as DC dp=[(Omax' dp+Omin' dp)/2], respectively, and each respective data point may be locally corrected for local DC-offset variations by subtracting DC dp at each respective data point from the amplitude-corrected quadrature signal data value at that respective data point, for example, by subtracting DC 440 from the amplitude-corrected quadrature signal data value [$SA1_{440}$/(k*Amp 440)] at the data point 440.

Figure 14:
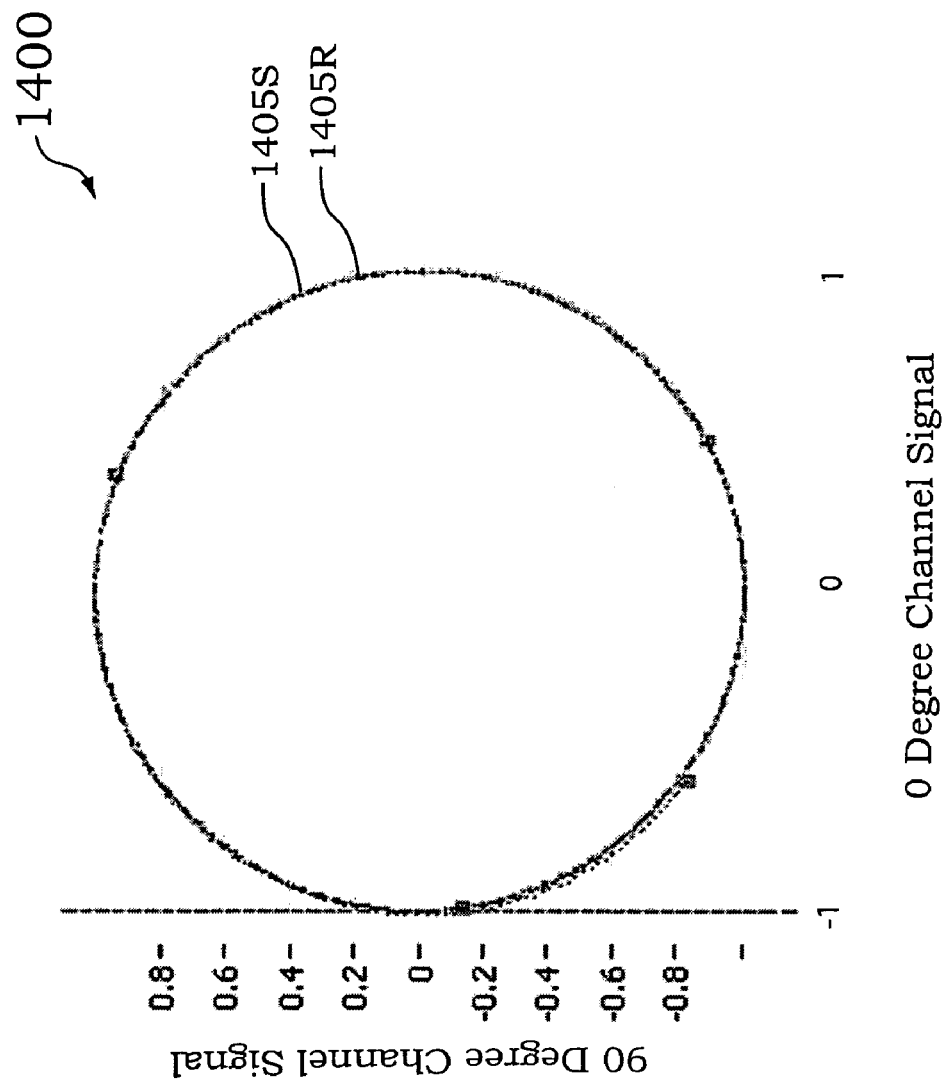
FIG. 14 is a diagram illustrating two exemplary lissajous plots respectively corresponding to measurement signals from a sample interferometer and a reference interferometer, for a third combination of measurement signal error component corrections.

FIG. 14 shows a diagram 1400 that includes a plot 1405S and a plot 1405R, which overlay one another. The plot 1405S and 1405R, respectively, include the same data as that included in the plots 1105S and 1105R, respectively, of the diagram 1100 shown FIG. 11, but including local amplitude and offset corrections to all of the quadrature signal data, as outlined above with reference to FIG. 13. As a result of the local amplitude and offset corrections outlined above, the scatter that remained in the plots 1105S and 1105R shown in FIG. 11 may have been substantially reduced or eliminated in the plots 1405S and 1405R. It will be appreciated that the local amplitude and offset corrections to all of the quadrature signal data, as outlined above with reference to FIG. 13, may generally be useful as a data correction method for improving a measurement accuracy according to this invention, regardless of whether the data is used to provide a coarse measurement, a medium measurement, or a fine resolution measurement.

Figure 15:
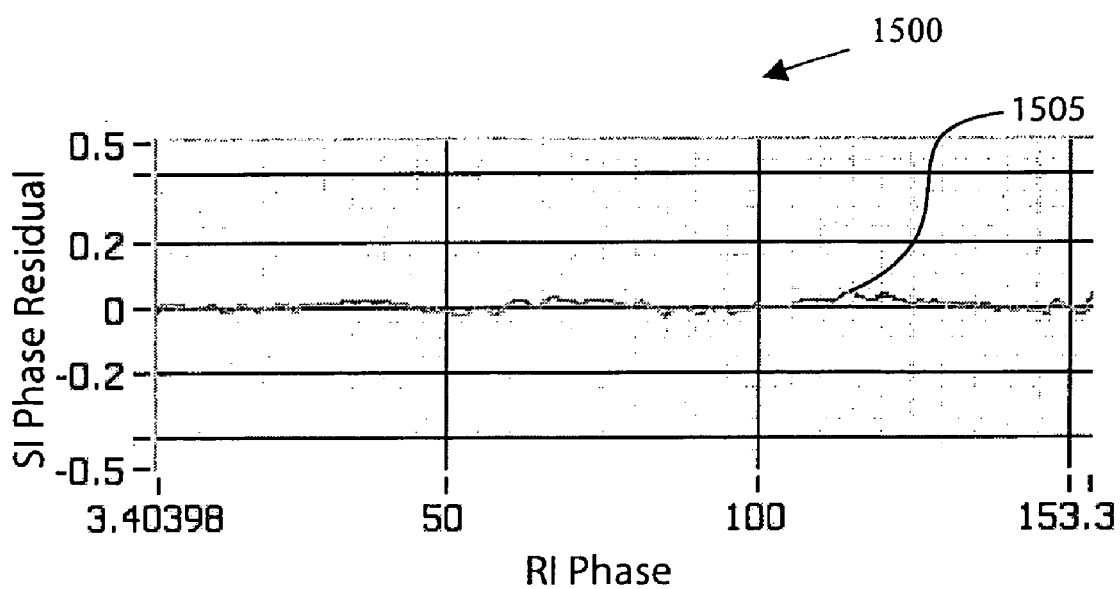
FIG. 15 is diagram illustrating an exemplary set of residual errors that may be displayed by the data of the exemplary relationship illustrated in FIG. 9, using the third combination of measurement signal error component corrections reflected in FIG. 13.

FIG. 15 shows a diagram 1500 that includes a residual plot 1505 that includes the same data as that included in the residual plot 1205 of the diagram 1200 shown FIG. 12, but including the additional local amplitude and offset corrections previously discussed with reference to FIG. 14. As shown in FIG. 15, the residual phase errors of the sample interferometer phase measurements compared to the best-fit line are on the order of 0.1 radians peak-to-peak. Thus, the coarse resolution and accuracy obtained by the additional global phase correction and local amplitude and offset methods outlined above may be at a further refined level, and the range-to-resolution figure of merit of the interferometric measurement systems and methods according to this invention may be further improved in comparison to various prior art systems and methods. In one implementation that produced the data shown in FIG. 15, the coarse absolute range may be approximately 10-100 mm, the coarse measurement accuracy may be on the order of 2-4 microns, and the coarse measurement resolution may be on the order 0.1 microns.

Regarding the use of an intermediate wavelength as previously outlined, an intermediate synthetic wavelength based on two optical wavelengths λ1 and λ2 may be determined according to the general equation $$\lambda_{intermediate} = \frac{\lambda 1 * \lambda 2}{|\lambda 1 - \lambda 2|} \quad (9)$$

In one implementation that includes various features described previously with reference to FIGS. 1, 3A, 3B, 4A and 4B, the intermediate wavelength may be based on the D1 and D2 rubidium lines. When λ1 is the wavelength of the rubidium D2 line, approximately 780 nm, and λ2 is the wavelength of the rubidium D1 line, approximately 795 nm, then $\lambda_{intermediate}$ is approximately 41 microns. Sets of simultaneously-obtained measurement values precisely corresponding to the precisely known wavelengths of the D1 and D2 lines may be determined for the sample interferometer, as previously described with reference to FIGS. 3A and 3B. The sets of measurement values may be determined by interpolation between data points when the D1 and D2 line wavelengths do not correspond precisely with any one set of measurement values acquired during a wavelength scan.

Phase measurements $\phi_{S,\lambda 1=RbD2}$, and $\phi_{S,\lambda 2=RbD1}$ may be determined, based on the sets of sample interferometer measurement values. The phase measurement determinations may include any or all of the error component corrections described previously, although it may be advantageous to use all of the previously described error correction techniques. The difference between these phase measurements, ($\phi_{S,\lambda 1=RbD2}-\phi_{S,\lambda 2=RbD1}$), which is the intermediate wavelength phase measurement, is an "incremental" measurement that undergoes one cycle over the distance corresponding to $\lambda_{intermediate,Rb}$. That is, the difference between these phase measurements provides an incremental measurement within one $\lambda_{intermediate,Rb}$ wavelength, but the overall number of wavelengths included in the associated distance measurement is not determined. However, the coarse resolution absolute distance measurement $z_{coarse}$, determined as outlined according to Eq. (5), and for example, can resolve this ambiguity, since it is accurate to within better than one half of $\lambda_{intermediate}$. Accordingly, the number of whole wavelengths $\lambda_{intermediate,Rb}$ included in the measurement distance according to $z_{coarse}$ may be added to the incremental intermediate wavelength phase measurement ($\phi_{S,\lambda 1=RbD2}-\phi_{S,\lambda 2=RbD1}$) to provide a total or absolute phase difference ($\phi_{S,\lambda 1=RbD2}-\phi_{S,\lambda 2=RbD1}$)$_{ABS}$, distinguished by the trailing "ABS" subscript. Thus, the improved-resolution absolute distance measurement based on the intermediate wavelength is:

$$z_{intermediate,Rb} = \frac{\lambda_{intermediate,Rb}}{2} \frac{(\phi_{S,\lambda 1 = RbD2} - \phi_{S,\lambda 2 = RbD1})_{ABS}}{2\pi} \quad (10)$$

Even though the constituent phase measurements used to determine $z_{intermediate,Rb}$ may be made quite accurate by including the various error component corrections described above, $z_{intermediate,Rb}$ may be based only on the data points that correspond precisely to the rubidium D2 and D1 wavelengths during the wavelength scans. Thus, it may remain sensitive to various residual phase measurement errors described above, as well as residual errors due to the effects of vibration and other environmental influences. These residual phase measurement errors may be associated with short range errors in the $z_{intermediate}$ absolute distance measurement as the sample distance is changed. In order to further improve the intermediate resolution and accuracy, and improve the range-to-resolution figure of merit for an interferometric measurement system according to this invention, it would be desirable to further reduce these short range errors in the $z_{intermediate,Rb}$ absolute distance measurement.

To further reduce these short range errors, the phase measurements and absolute wavelengths associated with as many data points dp as desired throughout a wavelength scan may be used to calculate $z_{intermediate}$. The resulting measurements may then be averaged to give an improved $z_{intermediate}$ absolute distance measurement, as outlined below.

Assume, for example, that we are going to average intermediate wavelength measurement results based on the λ1 wavelength scan and the λ2 wavelength scan. The wavelengths λ1dp and λ2dp that will be used for each data point are the corrected wavelengths at that data point, as shown in FIGS. 4A and 4B, for example. Wavelength correction is described further below. We may define a synthetic intermediate wavelength associated with each data point dp in the λ1 and λ2 wavelength scans based on the wavelength λ1dp and the wavelength λ2dp according to Eq. (9). We may generalize Eq. 10 based on the foregoing description, at each data point dp:

$$z_{intermediate,\lambda 1dp,\lambda 2dp} = \frac{\lambda_{intermediate,\lambda 1dp,\lambda 2dp}}{2} \frac{(\phi_{S,\lambda 1dp} - \phi_{S,\lambda 2dp})_{ABS}}{2\pi} \quad (11)$$

We may then average the entire set of such $z_{intermediate,\lambda 1dp,\lambda 2dp}$ intermediate absolute distance measurements to provide a more robust $z_{intermediate}$ absolute distance measurement with a reduced short range error.

The intermediate resolution and accuracy obtained by the various methods outlined above may be at a refined level compared to various prior art techniques for intermediate absolute measurement, improving the range-to-resolution figure of merit of the interferometric measurement systems and methods according to this invention, compared to various prior art systems and methods, particularly in combination with the improved coarse resolution and accuracy obtained by the various methods outlined previously.

Regarding the use of a fine optical wavelength as previously outlined, either, or both, of the phase measurements $\phi_{S,\lambda 1=RbD2}$, or $\phi_{S,\lambda 2=RbD1}$ described above may provide a usable fine wavelength phase measurement. The phase measurement determinations may include any or all of the error component corrections described previously, although it may be advantageous to use all of the previously described error correction techniques. Such phase measurements provide an incremental measurement within the associated optical wavelength, but the overall number of wavelengths included in the associated distance measurement is not determined. However, the intermediate resolution absolute distance measurement $z_{intermediate}$, determined as outlined above, for example, can resolve this ambiguity, since it may be accurate to within better than one half of $\lambda_{fine}=\lambda RbD2$ and/or $\lambda_{fine}=\lambda RbD1$. Accordingly, the number of whole wavelengths $\lambda_{fine}$ included in the measurement distance according to $z_{intermediate}$ may be added to the incremental fine wavelength phase measurement to provide a total or absolute phase measurement $(\phi_{fine})_{ABS}=(\phi_{S,\lambda 1=RbD2})_{ABS}$ or $(\phi_{fine})_{ABS}=(\phi_{S,\lambda 2=RbD1})_{ABS}$, distinguished by the trailing "ABS" subscripts. Thus, the improved-resolution absolute distance measurement based on the fine optical wavelength is:

$$z_{fine} = \frac{\lambda_{fine}}{2} \frac{(\phi_{S,\lambda fine})_{ABS}}{2\pi} \quad (12)$$

Even though the constituent phase measurements used to determine $z_{fine}$ may be made quite accurate by including the various error component corrections described above, $z_{fine}$ is based only on the data points that correspond precisely to the fine wavelength during the wavelength scan. Thus, it may remain sensitive to various residual phase measurement errors described above, as well as residual errors due to the effects of vibration and other environmental influences. These residual phase measurement errors may be associated with short range errors in the $z_{fine}$ absolute distance measurement as the sample distance is changed. In order to further improve the intermediate resolution and accuracy, and improve the range-to-resolution figure of merit for an interferometric measurement system according to this invention, it may be desirable to further reduce these short range errors in the $z_{fine}$ absolute distance measurement.

To further reduce these short range errors, the phase measurements and absolute wavelengths associated with as many data points dp as desired throughout a wavelength scan can be used to calculate $z_{fine}$. The resulting measurements may then be averaged to give an improved $z_{fine}$ absolute distance measurement, as outlined below.

By analogy with the averaging used to improve the intermediate distance measurement, assume, for example, that we are going to average fine wavelength measurements results based on the λ1 wavelength scan. The wavelength λ1dp that will be used for each λ1 wavelength scan data point is the corrected wavelength at that data point, as shown in FIG. 4A, for example. Wavelength correction is described further below. We may generalize Eq. 12 based on the foregoing description, at each data point dp:

$$z_{fine,\lambda 1dp} = \frac{\lambda_{fine=\lambda 1dp}}{2} \frac{(\phi_{S,\lambda fine=\lambda 1dp})_{ABS}}{2\pi} \quad (13)$$

We may then average the entire set of such $z_{fine,\lambda 1dp}$ fine absolute distance measurements to provide a more robust $z_{fine}$ absolute distance measurement with a reduced short range error.

The fine resolution and accuracy obtained by the methods outlined above may be at a refined level compared to various prior art techniques for fine absolute measurement, improving the range-to-resolution figure of merit of the interferometric measurement systems and methods according to this invention, compared to various prior art systems and methods, particularly in combination with the improved medium and coarse resolution and accuracy obtained by the various methods outlined previously.

Wavelength correction may be based on the reference length $L_R$. The instability of the reference length $L_R$ under environmental influences may be held to less than +/−one-half of an intermediate wavelength. Therefore, the whole number of intermediate wavelengths included in the reference length $L_R$ may be known to +/−one-half of an intermediate wavelength at all times, by design. Accordingly, an intermediate wavelength measurement may be performed using the reference interferometer, to determine the reference length $L_R$ to an intermediate resolution. That is:

$$L_{R,intermediate,Rb} = \frac{\lambda_{intermediate,Rb}}{2} \frac{(\phi_{R,\lambda1=RbD2} - \phi_{R,\lambda2=RbD1})_{ABS}}{2\pi} \quad (14)$$

Since the intermediate resolution absolute distance measurement $L_{R,\,intermediate,\,Rb}$ may be accurate to within better than one half of $\lambda_{fine}$=$\lambda$RbD2 and/or $\lambda_{fine}$=$\lambda$RbD1, a fine wavelength measurement may be performed using the reference interferometer, to determine the reference length $L_R$ to a fine resolution. That is:

$$L_R = \frac{\lambda_{fineRb}}{2} \frac{(\phi_{R,\lambda fineRb})_{ABS}}{2\pi} \quad (15)$$

This is a precisely calibrated reference length that is traceable to a rubidium reference wavelength, and that may be updated each measurement cycle, if desired.

Then, the wavelength at each data point throughout a $\lambda 1$ wavelength scan may be corrected based on the calibrated reference length $L_R$:

$$\lambda 1 dp = \frac{4\pi L_R * \lambda_{RbD2}}{(\phi_{R,\lambda1} - \phi_{R,\lambda1=RbD2})_{ABS}\lambda_{RbD2} + 4\pi L_R} \quad (16)$$

where $\phi_{R,\lambda1}$ is the phase measurement associated with the measurement signals at that data point, including various error component corrections outlined above, prior to the wavelength correction. Similarly, the wavelength at each data point throughout a $\lambda 2$ wavelength scan may be corrected based on the calibrated reference length $L_R$:

$$\lambda 2 dp = \frac{4\pi L_R * \lambda_{RbD1}}{(\phi_{R,\lambda2} - \phi_{R,\lambda2=RbD1})_{ABS}\lambda_{RbD1} + 4\pi L_R} \quad (17)$$

If vibrations or motion are present between the sample and the sample interferometer, the coarse resolution measurement may be particularly sensitive to such vibrations or motion because such motions change the ratio of the path lengths of the sample and reference interferometers, which has been assumed to be constant in previous descriptions herein. When the motion amplitude and frequency are not sufficient to cause phase measurement aliasing at the sample rate of the sensor, an additional error component correction may be provided to correct for dynamic changes in the sample interferometer. We can correct for vibration because the related effects are common mode effects that are nominally the same for both of the simultaneous $\lambda 1$ and $\lambda 2$ measurements at each data point. For the sample interferometer, relative to a reference data point dp=ref, the distance change that is present in other data points dp due to vibration may be written as $((\Delta\phi_{s,\lambda 1dp})_{ABS}*\lambda 1dp)$ for the $\lambda 1$ wavelength scan data points, and $((\Delta\phi_{s,\lambda 2dp})_{ABS}*\lambda 2dp)$ for the $\lambda 2$ wavelength scan data points. These expressions are equal, because the underlying distance change due to vibration is the same. Therefore:

$$(\Delta\phi_{S,\lambda 1dp})_{ABS} = \frac{\lambda 2dp}{\lambda 1dp}(\Delta\phi_{S,\lambda 2dp})_{ABS} \quad (18A)$$

$$= \frac{\lambda 2dp}{\lambda 1dp}(\phi_{S,\lambda 2dp} - \phi_{S,\lambda 2(dp=ref)})_{ABS} \quad (18B)$$

According to one method of providing a vibration error component correction, the phase measurement of each $\lambda 1$ data point dp of the sample interferometer that is used in determining the slope or ratio m included in Eq. (5), for example, as previously discussed with reference to FIG. 9, may be corrected by determining the expression shown in Eq. (18B) for each data point dp and subtracting that expression from the phase measurement data, regardless of other error component corrections previously applied to determine the phase measurement.

The vibration error component correction may be extended to include correction for vibrations that may be present in the reference interferometer. For the reference interferometer, relative to a reference data point dp=ref, the distance change that is present in other data points dp due to vibration may be written as $((\Delta\phi_{R,\lambda 1dp})_{ABS}*\lambda 1dp)$ for the $\lambda 1$ wavelength scan data points, and $((\Delta\phi_{R,\lambda 2dp})_{ABS}*\lambda 2dp)$ for the $\lambda 2$ wavelength scan data points. These expressions are equal, because the underlying distance change due to vibration is the same. Therefore:

$$(\Delta\phi_{R,\lambda 1dp})_{ABS} = \frac{\lambda 2dp}{\lambda 1dp}(\Delta\phi_{R,\lambda 2dp})_{ABS} \quad (19A)$$

$$= \frac{\lambda 2dp}{\lambda 1dp}(\phi_{R,\lambda 2dp} - \phi_{R,\lambda 2(dp=ref)})_{ABS} \quad (19B)$$

According to this extended method of vibration correction, the phase measurement of each $\lambda 1$ data point dp of the reference interferometer that is used in determining the slope or ratio m included in Eq. (5), for example, as previously discussed with reference to FIG. 9, may be corrected by determining the expression shown in Eq. (19B) for each data point dp and subtracting that expression from the phase measurement data, regardless of other error component corrections previously applied to determine the phase measurement.

Figure 16:
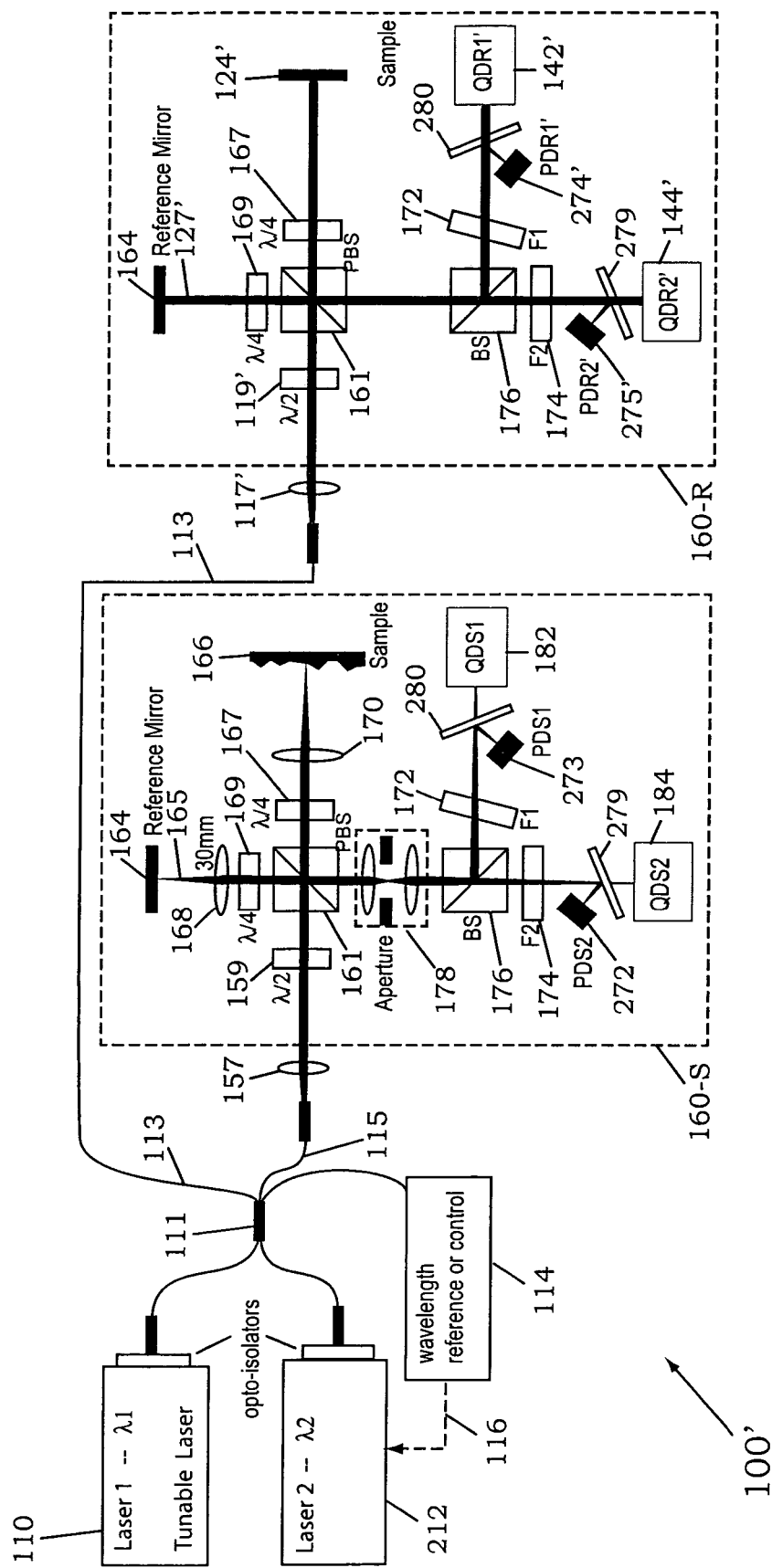
FIG. 16 illustrates an exemplary dual laser interferometric measurement system usable for absolute distance measurement, including a reference interferometer path and a sample interferometer path that share a number of components.

FIG. 16 shows an exemplary interferometric measurement system 100' which may be used to practice the methods disclosed herein. The dual laser interferometric measurement system 100' may be used for absolute distance measurement, operates in a manner that is similar to the interferometric measurement system 100 shown in FIG. 1. Components numbered similarly in FIG. 16 and FIG. 1 may be similar or identical unless otherwise indicated by description or context. Therefore, only significant details and differences of the interferometric measurement system 100' are described below.

The interferometric measurement system 100' may comprise two lasers and may include a reference interferometer path 160-S and a sample interferometer path 160-R that share a number of components. As previously described with reference to FIG. 1, the tunable laser 110 may output a tunable wavelength $\lambda 1$ over a first wavelength range and the second laser 212 may output a wavelength $\lambda 2$. In various configurations and/or operating modes, the second wavelength $\lambda 2$ may be either a fixed wavelength or a tunable wavelength over a second wavelength range. The outputs of lasers 110 and 212 may be combined at an optical coupler 111 and may be routed to the reference interferometer path 160-R and the sample interferometer path 160-S, respectively. In the configuration shown in FIG. 16, the outputs of lasers 110 and 112 may also be routed to the wavelength reference or control 114.

The laser 110 generates coherent light having a wavelength $\lambda 1$ that may be tunable over a desired wavelength range that may include a particular desired wavelength, for example, about 780 nm. The interferometric measurement system 100' may use a relative small tuning range for the tunable laser 110. The '961 laser may be optimized for such a tuning range, as described in the '961 application. Thus, the interferometric measurement system 100' may be made particularly economical, robust, accurate and compact, in combination with the '961 laser. The '961 laser has been briefly described previously, with reference to FIGS. 2A and 2B. Other laser sources that may be used for the tunable laser 110 may include distributed Bragg reflector (DBR) lasers, or any other now-known or later developed tunable laser that may provide a usable wavelength range.

In various configurations of the interferometric measurement system 100', the laser 212 may be either a fixed wavelength laser or a tunable wavelength laser, for example, similar to the tunable laser 110. Although the following description emphasizes configurations in which the laser 212 is a tunable laser, the laser 212 may be a single wavelength laser. It should be appreciated that in various configurations where the laser 212 may be a tunable wavelength laser, such as the '961 laser, the interferometric measurement system 100' may use a relative small tuning range for the tunable laser 212, and the '961 laser may be optimized for such a tuning range, as described in the '961 application.

In the configuration shown in FIG. 16, the output of the tunable laser 110 and the laser 212 may be directed to the polarization maintaining optical coupler 111, which may split the signal into two different output fibers 113 and 115. Fiber 113 may direct the light through a collimating lens 117', to a half wave plate 119', and to the reference interferometer path 160-R. Similarly, fiber 115 may direct the light through a collimating lens 157, to a half wave plate 159, and to the sample interferometer path 160-S. As previously indicated, the reference interferometer path 160-R and the sample interferometer path 160-S may share a number of components and respective beam paths thereof may be arranged in a parallel non-overlapping configuration through the shared components, in an "over-under" arrangement, for example. That is, the reference interferometer path 160-R may use an "upper half" of the various shared components and the sample interferometer path 160-S may use a "lower half" of the various shared components. Thus, it should be appreciated that the component and beam layouts numbered 160-R and 160-S in FIG. 16 are shown side-by-side only for clarity of illustration. In practice, the similarly numbered components in the two layouts may be the same components, and the beam paths of the respective layouts numbered 160-R and 160-S may be separated by a small amount along a direction that corresponds to a direction in and out of the page of FIG. 16. Components that are not shared may be miniature optical components, for example, to facilitate compact design and closely spaced beam paths along the direction in and out of the page. Components that are not shared, but that are shown schematically in coinciding positions in the layouts numbered 160-R and 160-S in FIG. 16, may either be miniature optical components mounted side-by-side, having a size just sufficient to accommodate their respective beams, or may be "staggered" along respective beam paths thereof, for example, to avoid mechanical interference.

Similar to the description with reference to FIG. 1, the half wave plates 119' and 159 may be respectively rotated or adjusted to rotate the effective polarization direction of the respective light beams input to polarizing beam splitter 161. This may in turn adjust the respective intensities of the orthogonally polarized components of the light output to the sample interferometer path 160-S and the reference interferometer path 160-R, respectively, according to known techniques. This may be particularly useful because the light reflected from a low reflectivity sample surface 166 may otherwise be of much lower intensity than light reflected from the reference mirror 164.

Unless otherwise indicated by explicit description or by context, the following discussion assumes that the laser 212 is a tunable laser. The laser 212 may generate coherent light having a wavelength $\lambda 2$ that may be tunable over a desired wavelength range that may include a desired particular wavelength, for example, about 795 nm. The light output from laser 212 may be directed to the optical coupler 111 and may also be directed to a wavelength reference and/or control device 114. In various configurations, the wavelength reference and/or control device 114 may provide a feedback signal 116 to the laser 212, for example, to control or stabilize the laser at a desired wavelength. For example, regardless of whether the laser 212 is a fixed laser or a tunable laser, the wavelength reference and/or control device 114 may provide a control signal used to control or stabilize the laser 212 at a precise reference wavelength usable by the interferometric measurement system 100' to provide traceable, high accuracy measurements. Such control and/or stabilization may be provided according to any suitable now-known or later-developed technique. In various other embodiments, the wavelength reference and/or control device 114 may simply provide one or more signals usable to identify when one or more reference wavelengths are output from the lasers 110 and/or 212, without actually controlling such wavelengths. The implementation and utility of such a technique has been previously described.

Reference interferometer path 160-R may comprise a respective portion of the polarizing beam splitter 161, respective portions of the two quarter wave plates 167 and 169, a reference mirror 124', a respective portion of the reference mirror 164, a respective portion of the beam splitter 176, respective portions of the two optical filters 172 and 174, two optical power detectors 274' and 275', respective portions of the two partially reflecting surfaces 279 and 280, and two quadrature detectors, the $\lambda 1$ quadrature detector 142' and the $\lambda 2$ quadrature detector 144'. For the reference interferometer path 160-R, after traversing the collimating lens 117' and the half wave plate 119', the input light may be incident on a respective portion of the polarizing beam splitter 161, which may split the beam into two properly oriented orthogonally polarized output beams that may have intensities that depend on the polarization direction of the input light from the half wave plate 119', as previously outlined. The beam of light transmitted through the polarizing beam splitter 161 may be directed through a respective portion of the first quarter wave plate 167 and onto first reference mirror 124'. The first quarter wave plate 167, in a double pass arrangement, may rotate the plane of polarization of the beam by 90 degrees, so that the P-polarized light that was transmitted through the polarizing beam splitter may be turned into S-polarized light that may be reflected by a respective portion of the polarizing beam splitter 161 on the second pass.

The beam that was reflected by a respective portion of the polarizing beam splitter 161 may be directed through a respective portion of the second quarter wave plate 169 and onto a respective portion of the second reference mirror 164. The second quarter wave plate 169, in a double pass arrangement, may rotate the plane of polarization of the beam by 90 degrees, so that the S-polarized light that was reflected from a respective portion of the polarizing beam splitter 161 may be turned into P-polarized light that may be transmitted by the polarizing beam splitter 161 on the second pass. The two respective beams of light of the reference interferometer path 160-R may be reflected off the reference mirrors 124' and 164 and re-enter the polarizing beam splitter 161, whereby the beams may interfere according to the relative distances between the polarizing beam splitter 161 and the first reference mirror 124' and between the polarizing beam splitter 161 and the second reference mirror 164. The recombined beam may then be directed to a respective portion of the second beam splitter 176, which may again divide the beam into two beams, directing one beam into the λ1 quadrature detector 142', via a respective portion of the λ1 optical filter 172, and the other beam into the λ2 quadrature detector 144', via a respective portion of the λ2 optical filter 174.

The λ1 optical filter 172 may transmit only light arising from the tunable laser 110, for example, with a pass band that covers the wavelengths within the λ1 wavelength range used by the interferometric measurement system 100'. Similarly, the λ2 optical filter 174 may transmit only light arising from the laser 212, for example, with a pass band that covers the wavelength or wavelengths within the λ2 wavelength range used by the interferometric measurement system 100'. After passing through the λ1 optical filter 172, the light may be incident on a respective portion of an optional partially reflecting surface 280, which may reflect a portion of the light to an optional optical power detector 274'. The remaining light may then be input to the λ1 quadrature detector 142'. After passing through a respective portion of the λ2 optical filter 174, the light may be incident on an optional partially reflecting surface 279, which may reflect a portion of the light to an optional optical power detector 275'. The remaining light may then be input to the λ2 quadrature detector 144', which may operate in the same manner as the quadrature detectors previously described.

The purpose of reference interferometer path 160-R is to provide a reference optical path length that may be characterized or calibrated to a high precision. The reference optical path length may then be used to facilitate a relatively accurate coarse absolute distance as described previously. The high precision reference optical path length may furthermore be used in other various correction techniques that may be applied to other signals and/or measurements determined for the interferometric measurement system 100', as described previously. Since various dimensions and optical properties of the interferometric measurement system 100', and particularly the sample interferometer path 160-S, may be expected to change with changing external conditions, the high precision reference optical path length can provide a normalization factor to correct for such effects, as described previously. In various practical implementations, the reference interferometer may provide reference optical path length mechanical stability or repeatability of approximately 1 part in $10^4$. As outlined previously, in various implementations, using the method based on using the rubidium D1 and D2 wavelength (frequency) references, the reference optical path length may be dynamically calibrated at various desired times during normal operation of the interferometric measurement system 100', for example, to an accuracy or repeatability of approximately 1 part in $10^6$. Such a dynamic calibration may be performed during each measurement cycle, if desired, which may allow the operation of the interferometric measurement system 100' to remain accurate and robust, even when operating in various industrial environments which would otherwise be incompatible with such levels of accuracy and repeatability.

The sample interferometer path 160-S may comprise components similar to those previously described for the reference interferometer path 160-R and/or the sample interferometer 160 shown in FIG. 1, including the collimating lens 157, the half wave plate 159, the first and second quarter wave plates 169 and 167, the polarizing beam splitter 161, a focusing lens 168, an objective lens 170, the reference mirror 164, a sample surface 166, a telecentric aperture arrangement 178, the beam splitter 176, the λ1 and λ2 optical filters 172 and 174, the optional partially reflecting surface 279 and the optional optical power detector 272, the optional partially reflecting surface 280 and the optional optical power detector 273, and two quadrature detectors, the λ1 quadrature detector 182 and the λ2 quadrature detector 184.

For the sample interferometer path 160-S, after traversing the collimating lens 157 and the half wave plate 159, the input light may be incident on a respective portion of the polarizing beam splitter 161. Polarizing beam splitter 161 may function to transmit P-polarized light and to reflect S-polarized light. The transmitted light may then be incident on a respective portion of the first quarter wave plate 167, which in a double pass arrangement may rotate the plane of polarization of the beam by 90 degrees, so that the P-polarized light that was transmitted through the polarizing beam splitter 161 may be turned into S-polarized light that may be reflected by a respective portion of the polarizing beam splitter 161 on the second pass. A respective portion of the second quarter wave plate 169, in a double pass arrangement, may rotate the plane of polarization of the beam by 90 degrees, so that the S-polarized light that was reflected from a respective portion of the polarizing beam splitter 161 may be turned into P-polarized light that may be transmitted by the polarizing beam splitter 161 on the second pass.

Light that is reflected at the first pass of the polarizing beam splitter 161 may become a reference beam of the sample interferometer path 160-S, for example, by traversing a respective portion of the quarter wave plate 169 before passing through an optional focusing lens 168 and reflecting from a respective portion of the reference mirror 164 at a first optical path length from the polarizing beamsplitter 161. Light that is transmitted at the first pass of the polarizing beam splitter 161 may become the object beam of the sample interferometer path 160-S, for example, by traversing a respective portion of the quarter wave plate 167 and an objective lens 170 before reflecting from the sample surface 166 at a second optical path length from the polarizing beam splitter 161. The difference between the first optical path length and the second optical path length in the sample interferometer path 160-S may be referred to as the measurement path length. The measurement distance to the sample 166 is one half of the measurement path length. The optional focusing lens 168 and the objective lens 170 may operate in the manner previously described with reference to the sample interferometer 160, shown in FIG. 1.

At the polarizing beam splitter 161, the light from the reflected reference beam of the sample interferometer path 160-S may be recombined with light from the reflected object beam of the sample interferometer path 160-S and directed to pass through the aperture arrangement 178 to a respective portion of the second beam splitter 176. The aperture arrangement 178 may operate in the manner previously described with reference to the sample interferometer 160, shown in FIG. 1. The second beam splitter 176 may split the beam into two respective beams of nominally equal intensities, directing one beam toward the λ1 quadrature detector 182, via a respective portion of the λ1 optical filter 172, and the other beam toward the λ2 quadrature detector 184, via a respective portion of the λ2 optical filter 174. After passing through the λ1 optical filter 172, the light may be incident on a respective portion of the optional partially reflecting surface 280, which may reflect a portion of the light to an optional optical power detector 273, the transmitted portion of the light being input to the λ1 quadrature detector 182. After passing through a respective portion of the λ2 optical filter 174, the light may be incident on a respective portion of the optional partially reflecting surface 279, which may reflect a portion of the light to an optional optical power detector 272, the transmitted portion of the light being input to the λ2 quadrature detector 184.

The various electronic and/or optoelectronic components of the interferometric measurement system 100' may be connected to a signal processing and control system according to known methods. The signal processing and control system may provide various control signals to the interferometric measurement system 100' and may acquire and process various measurement signals obtained from the interferometric measurement system 100', including any or all of the various error corrections described previously.

The previous descriptions have emphasized configurations where each laser is a tunable laser. However, in various other configurations one of the lasers may be a single wavelength laser. In such a case, many of the error component correction techniques outlined may be adapted, or practiced independently of, the single wavelength laser, such that they remain fully, or at least partially, effective. In any case, in various implementations of the various error component correction techniques outlined above, whether adapted to a single wavelength laser or not, may be used separately, or in various combinations, and significant benefits may be obtained in such implementations.

The previous descriptions have also emphasized configurations that include a reference interferometer beam path. As previously indicated, the purpose of a reference interferometer beam path is to provide a reference optical path length that may be characterized or calibrated to a high precision and may be used to facilitate various error correction techniques, including correction of dynamic error correction techniques, that may be applied to various signals and/or measurements, as described previously. However, in various other configurations, the reference interferometer beam path and the associated components, if not required for a sample interferometer beam path, may be omitted. In such a case, the error component correction techniques outlined herein that do not depend on using the reference optical path length may be adapted or practiced independently, such that the techniques remain fully, or at least partially, effective. For example, a highly accurate medium-wavelength absolute measurement and/or fine wavelength measurement may be determined based on methods described above that use the rubidium D1 and/or D2 wavelength (frequency) reference(s) and the various global and/or local error correction techniques outlined above, without the use of corrections that are based on the reference optical path length. In such a case, in various implementations, the various error component correction techniques outlined above may be used separately, or in various combinations, and significant benefits may be obtained in such implementations.

As a further alternative, a suitable commercially available wavemeter may be used, instead of the methods disclosed above, based on the reference optical path length to determine and/or correct the wavelengths associated with the various data points described above. In such a case, substantially all of the error correction techniques outlined above, including the measurement averaging techniques described with reference to Eqs. 11 and 13 and other techniques that are described herein that are enhanced by using corrected wavelength data, may be practiced as outlined, without the use of a reference interferometer beam path.

Described below is an exemplary set of operations A1-A11 that may use less than all of the previously described interferometer components and error correction techniques, while still providing significant accuracy improvements:

A1. Input a first scanned wavelength over a first wavelength range, and a second wavelength not included in the first wavelength range, to a sample interferometer beam path.

A2. Acquire a plurality of respective data points over time as the first scanned wavelength is scanned, the plurality respective data points including a plurality of respective sample interferometer first-wavelength quadrature signal measurements, and at least one of the respective data points including a respective second-wavelength quadrature signal measurement.

The second laser may be a fixed wavelength laser. In such a case, in some embodiments of the A2 operations, it may suffice that only one data point include the quadrature signal measurements corresponding to the second wavelength. In embodiments in which the second wavelength coincides with one of the rubidium wavelengths described previously, it may be advantageous if that one data point is the data point at which the first scanned wavelength coincides with the other rubidium wavelength, so that a medium resolution distance measurement may be determined based on traceable wavelengths. In other embodiments of the A2 operations, each of the data points may include quadrature signal measurements corresponding to a fixed second wavelength.

A3. Correct the plurality of respective sample interferometer first-wavelength quadrature signal measurements for dc offset and amplitude error components to provide a plurality of respective offset-and-amplitude-corrected sample interferometer first-wavelength quadrature signal measurements.

In various embodiments of the A3 operations, one, or all, of the previously-described dc offset and amplitude error correction techniques may be used, including corrections based on one or more power measurements, corrections as described with reference to Eq. 4, corrections based on global or average error values for a plurality of data points, and/or local offset and/or amplitude error corrections such as those described with reference to FIG. 13.

A4. Determine a plurality of respective sample interferometer first-wavelength phase measurements based on the respective offset-and-amplitude-corrected sample interferometer first-wavelength quadrature signal measurements.

A5. Analyze a set of respective sample interferometer first-wavelength phase measurements that span $2\pi$ radians of phase shift, or more, to determine a phase error component in the plurality of respective sample interferometer first-wavelength phase measurements, and correct the phase error component to provide a set of one or more respective phase-corrected sample interferometer first-wavelength phase measurements.

In various embodiments of the A5 operations, corrections based on techniques similar to those described with reference to Eqs. 6-8 and FIG. 8 may be used. In general, when using such techniques, it may be advantageous to use data points spanning at least one full phase cycle, and two, three, or more phase cycles may provide enhanced accuracy. However, in various embodiments, fewer data points may be used provided that appropriate curve- or ellipse-fitting techniques may be used so that the data points are fit by a method that is valid for less than a full cycle of data points.

A6. Correct at least one respective sample interferometer second-wavelength quadrature signal measurement for dc offset and amplitude error components to provide at least one offset-and-amplitude-corrected sample interferometer second-wavelength quadrature signal measurement.

In various embodiments of the A6 operations, one, or all, of the previously-described dc offset and amplitude error correction techniques may be used.

A7. Determine at least one respective second-wavelength phase measurement based on at least one respective offset-and-amplitude-corrected sample interferometer second-wavelength quadrature signal measurement.

A8. Determine at least one respective intermediate wavelength phase measurement having a corresponding respective medium wavelength, each respective intermediate wavelength phase measurement being based on a respective sample interferometer second-wavelength phase measurement and a respective phase-corrected sample interferometer first-wavelength phase measurement.

Determining a respective intermediate wavelength phase measurement may generally depend on knowing a respective first wavelength associated with a respective first-wavelength phase measurement and a respective second wavelength associated with a respective second-wavelength phase measurement, which may be used to determine the medium wavelength phase measurement. In some embodiments of the A8 operations, it may suffice that only one respective first-wavelength phase measurement correspond to a known respective first wavelength and only one respective second-wavelength phase measurement correspond to a known respective second wavelength. For example, such wavelengths and phase measurements may correspond to the rubidium wavelengths described previously and may be determined using techniques similar to those outlined previously. However, in other embodiments, a wavemeter may be used to determine the wavelengths associated with a plurality of data points, and in such a case, more than one respective intermediate wavelength phase measurement having a corresponding respective medium wavelength may be determined.

A9. Determine a medium-resolution absolute distance measurement based on the at least one respective intermediate wavelength phase measurement having a corresponding respective medium wavelength.

In some embodiments of the A9 operations, if only one respective intermediate wavelength phase measurement having a corresponding respective medium wavelength is determined by the A8 operations, then the medium-resolution absolute distance measurement may be based on that respective intermediate wavelength phase measurement and corresponding respective medium wavelength. However, if a plurality of respective intermediate wavelength phase measurements having a corresponding respective medium wavelengths are determined by the A8 operations, then the medium-resolution absolute distance measurement may be enhanced by averaging a set of "preliminary" medium-resolution absolute distance measurements based on the plurality of respective intermediate wavelength phase measurements and corresponding respective medium wavelengths.

A10. Determine or select at least one respective fine wavelength phase measurement having a corresponding known respective wavelength of light, each respective fine wavelength phase measurement being based on a respective sample interferometer second-wavelength phase measurement that includes a correction for at least one error component or a respective sample interferometer first-wavelength phase measurement that includes a correction for at least one error component.

In some embodiments of the A10 operations, only one respective first-wavelength phase measurement may correspond to a known respective first wavelength and only one respective second-wavelength phase measurement may correspond to a known respective second wavelength. For example, such wavelengths and phase measurements may correspond to the rubidium wavelengths described previously. However, in other embodiments, a wavemeter may be used to determine the wavelengths associated with a plurality of data points, and in such a case, more than one respective phase measurement corresponding to a known respective wavelength may be determined.

A11. Determine a high-resolution absolute distance measurement based on the medium-resolution absolute distance measurement and the at least one respective fine wavelength phase measurement having a corresponding respective wavelength of light.

In some embodiments of the A11 operations, if only one respective fine wavelength phase measurement having a corresponding respective known wavelength of light is determined by the A10 operations, then the high-resolution absolute distance measurement may be based on that respective fine wavelength phase measurement and corresponding respective known wavelength of light. However, if a plurality of respective high-resolution absolute distance measurement are determined by the A10 operations, then the high-resolution absolute distance measurement may be enhanced by averaging a set of "preliminary" high-resolution absolute distance measurements based on the plurality of respective fine wavelength phase measurements and corresponding respective known wavelengths of light.

It should be appreciated that although the exemplary operations A1-A11 have been outlined in an exemplary order, various operations may be performed in different order, in various embodiments, and/or iteratively in some cases.

Described below is an exemplary set of operations B1-B11 that may use additional or different interferometer components and/or error correction techniques, in comparison to the operations A1-A11:

B1. Input a first scanned wavelength over a first wavelength range, and a second scanned wavelength over a second wavelength range that does not overlap with the first wavelength range, to a sample interferometer beam path.

B2. Acquire a plurality of respective data points over time as the first scanned wavelength and second scanned wavelength are scanned, the plurality respective data points including a plurality of respective sample interferometer first-wavelength quadrature signal measurements and a plurality of respective sample interferometer second-wavelength quadrature signal measurements.

B3. Correct the plurality of respective sample interferometer first-wavelength quadrature signal measurements for dc offset and amplitude error components to provide a plurality of respective offset-and-amplitude-corrected sample interferometer first-wavelength quadrature signal measurements.

In various embodiments of the B3 operations, one, or all, of the previously-described dc offset and amplitude error correction techniques may be used.

B4. Determine a plurality of respective sample interferometer first-wavelength phase measurements based on the respective offset-and-amplitude-corrected sample interferometer first-wavelength quadrature signal measurements.

B5. Analyze a set of respective sample interferometer first-wavelength phase measurements that span $2\pi$ radians of phase shift, or more, to determine a phase error component in the plurality of respective sample interferometer first-wavelength phase measurements, and correct the phase error component to provide a set of one or more respective phase-corrected sample interferometer first-wavelength phase measurements.

Previous remarks regarding the A5 operations may be similarly applied to the B5 operations.

B6. Correct the plurality of respective sample interferometer second-wavelength quadrature signal measurements for dc offset and amplitude error components to provide a plurality of respective offset-and-amplitude-corrected sample interferometer second-wavelength quadrature signal measurements.

In various embodiments of the B6 operations, one, or all, of the previously-described dc offset and amplitude error correction techniques may be used.

B7. Determine a plurality of respective sample interferometer second-wavelength phase measurements based on the respective offset-and-amplitude-corrected sample interferometer second-wavelength quadrature signal measurements.

B8. Analyze a set of respective sample interferometer second-wavelength phase measurements that span $2\pi$ radians of phase shift, or more, to determine a phase error component in the plurality of respective sample interferometer second-wavelength phase measurements, and correct the phase error component to provide a set of one or more respective phase-corrected sample interferometer second-wavelength phase measurements.

Previous remarks regarding the A5 operations may be similarly applied to the B8 operations.

B9. Determine at least one respective intermediate wavelength phase measurement having a corresponding respective medium wavelength, each respective intermediate wavelength phase measurement being based on a respective phase-corrected sample interferometer second-wavelength phase measurement and a respective phase-corrected sample interferometer first-wavelength phase measurement.

Previous remarks regarding the A8 operations may be similarly applied to the B9 operations.

B10. Determine a medium-resolution absolute distance measurement based on the at least one respective intermediate wavelength phase measurement having a corresponding respective medium wavelength.

Previous remarks regarding the A9 operations may be similarly applied to the B10 operations.

B11. Determine or select at least one respective fine wavelength phase measurement having a corresponding known respective wavelength of light, each respective fine wavelength phase measurement being based on a respective sample interferometer second-wavelength phase measurement that includes a correction for at least one error component or a respective sample interferometer first-wavelength phase measurement that includes a correction for at least one error component Previous remarks regarding the A10 operations may be similarly applied to the B11 operations.

B12. Determine a high-resolution absolute distance measurement based on the medium-resolution absolute distance measurement and the at least one respective fine wavelength phase measurement having a corresponding respective wavelength of light.

Previous remarks regarding the A11 operations may be similarly applied to the B12 operations.

It should be appreciated that although the exemplary operations B1-B11 have been outlined in an exemplary order, various operations may be performed in different order, in various embodiments, and/or iteratively in some cases.

Described below is an exemplary set of operations C1-C15 that may use additional or different interferometer components and/or error correction techniques, in comparison to the operations A1-A11 and the operations B1-B12:

C1. Input a first scanned wavelength over a first wavelength range, and a second scanned wavelength over a second wavelength range that does not overlap with the first wavelength range, to a sample interferometer beam path and to a reference interferometer beam path, the reference interferometer beam path providing a known reference length.

C2. Acquire a plurality of respective data points over time as the first scanned wavelength and second scanned wavelength are scanned, the plurality respective data points including a plurality of respective sample interferometer first-wavelength quadrature signal measurements, a plurality of respective sample interferometer second-wavelength quadrature signal measurements, a plurality of respective reference interferometer first-wavelength quadrature signal measurements, and a plurality of respective reference interferometer second-wavelength quadrature signal measurements.

C3. Correct the plurality of respective sample interferometer first-wavelength quadrature signal measurements, the plurality of respective sample interferometer second-wavelength quadrature signal measurements, the plurality of respective reference interferometer first-wavelength quadrature signal measurements, and the plurality of respective reference interferometer second-wavelength quadrature signal measurements for dc offset and amplitude error components to provide a plurality of respective offset-and-amplitude-corrected sample interferometer first-wavelength quadrature signal measurements, a plurality of respective offset-and-amplitude-corrected sample interferometer second-wavelength quadrature signal measurements, a plurality of respective offset-and-amplitude-corrected reference interferometer first-wavelength quadrature signal measurements, and a plurality of respective offset-and-amplitude-corrected reference interferometer second-wavelength quadrature signal measurements.

In various embodiments of the C3 operations, one, or all, of the previously-described dc offset and amplitude error correction techniques may be used.

C4. Determine a plurality of respective sample interferometer first-wavelength phase measurements based on the respective offset-and-amplitude-corrected sample interferometer first-wavelength quadrature signal measurements.

C5. Analyze a set of respective sample interferometer first-wavelength phase measurements that span $2\pi$ radians of phase shift, or more, to determine a phase error component in the plurality of respective sample interferometer first-wavelength phase measurements, and correct the phase error component to provide a set comprising a respective phase-corrected sample interferometer first-wavelength phase measurements.

Previous remarks regarding the A5 operations may be similarly applied to the C5 operations.

C6. Determine a plurality of respective sample interferometer second-wavelength phase measurements based on the respective offset-and-amplitude-corrected sample interferometer second-wavelength quadrature signal measurements.

C7. Analyze a set of respective sample interferometer second-wavelength phase measurements that span $2\pi$ radians of phase shift, or more, to determine a phase error component in the plurality of respective sample interferometer second-wavelength phase measurements, and correct the phase error component to provide a set of one or more respective phase-corrected sample interferometer second-wavelength phase measurements.

Previous remarks regarding the A5 operations may be similarly applied to the C7 operations.

C8. Determine a plurality of respective reference interferometer first-wavelength phase measurements based on the respective offset-and-amplitude-corrected reference interferometer first-wavelength quadrature signal measurements.

C9. Analyze a set of respective reference interferometer first-wavelength phase measurements that span $2\pi$ radians of phase shift, or more, to determine a phase error component in the plurality of respective reference interferometer first-wavelength phase measurements, and correct the phase error component to provide a set of one or more respective phase-corrected reference interferometer first-wavelength phase measurements.

Previous remarks regarding the A5 operations may be similarly applied to the C9 operations.

C10. Determine a phase change ratio corresponding to dividing a difference between respective phase-corrected sample interferometer first-wavelength phase measurements at respective wavelengths by a difference between respective phase-corrected reference interferometer first-wavelength phase measurements at the same respective wavelengths, based on the plurality of respective phase-corrected sample interferometer first-wavelength phase measurements and the plurality of respective phase-corrected reference interferometer first-wavelength phase measurements.

In various embodiments of the C10 operations, techniques similar to those previously described with reference to FIG. 9 and Eq. 5 may be used.

C11. Determine a coarse-resolution absolute distance measurement based on the determined phase change ratio and the known reference length.

It should be appreciated that in the data points described in the C2 operations above, in conjunction with the use of the rubidium cell wavelength analysis techniques described previously with reference to 3A, 3B, 4A and 4B, may support operations that allow the reference length to be determined precisely for any or all data points and that allow the first and second wavelengths to be known or corrected precisely for any or all data points, according to techniques previously described. Thus, the operations C1-C15 may all be based on data and calculations that rely on such known reference length determination(s) and wavelength determination(s) to correct as many error components as possible, in accordance with the various error correction teachings disclosed herein.

C12. Determine at least one respective intermediate wavelength phase measurement having a corresponding respective medium wavelength, each respective intermediate wavelength phase measurement being based on a respective phase-corrected sample interferometer second-wavelength phase measurement and a respective phase-corrected sample interferometer first-wavelength phase measurement.

Previous remarks regarding the A8 operations may be similarly applied to the C12 operations. However, in contrast to one aspect of those remarks, in the C12 set of operations, a separate wavemeter is not necessary to provide a plurality of respective intermediate wavelength phase measurements, for reasons related to the remarks following the description of the C11 operations, above. Therefore, in general, it may be advantageous to determine a plurality of respective intermediate wavelength phase measurement having a corresponding respective medium wavelengths in the C12 operations.

C13. Determine a medium-resolution absolute distance measurement based on the coarse-resolution absolute distance measurement and the at least one respective intermediate wavelength phase measurement having a corresponding respective medium wavelength.

Previous remarks regarding the A9 operations may be similarly applied to the C13 operations.

C14. Determine or select at least one respective fine wavelength phase measurement having a corresponding known respective wavelength of light, each respective fine wavelength phase measurement being based on a respective sample interferometer second-wavelength phase measurement that includes a correction for at least one error component or a respective sample interferometer first-wavelength phase measurement that includes a correction for at least one error component Previous remarks regarding the A10 operations may be similarly applied to the C14 operations. However, in contrast to one aspect of those remarks, in the C14 set of operations, a separate wavemeter is not necessary to provide a plurality of respective intermediate wavelength phase measurements, for reasons related to the remarks following the description of the C11 operations, above. Therefore, in general, it may be advantageous to determine a plurality of respective fine wavelength phase measurements having a corresponding known respective wavelengths of light in the C14 operations.

C15. Determine a high-resolution absolute distance measurement based on the medium-resolution absolute distance measurement and the at least one respective fine wavelength phase measurement having a corresponding respective wavelength of light.

Previous remarks regarding the A11 operations may be similarly applied to the C15 operations.

It should be appreciated that although the exemplary operations C1-C15 have been outlined in an exemplary order, various operations may be performed in different order, in various embodiments, and/or iteratively in some cases.

While this invention has been described in conjunction with the exemplary details outlined above, it is evident that many alternatives, modifications and variations are possible. For example, the measurement techniques and various error component correction techniques outlined above are not limited in their application to systems that include one intermediate measurement, or systems that use four-phase quadrature detectors. These teachings may also be applicable to systems that include multiple intermediate measurements, and/or systems that use three-phase detection schemes, or the like. Accordingly, the exemplary details as set forth above are intended to be illustrative, not limiting.

What is claimed is:

1. A method for operating an absolute interferometer, comprising:

inputting a first scanned wavelength over a first wavelength range, and a second wavelength not included in the first wavelength range, to a sample interferometer beam path;

acquiring a plurality of respective data points over time as the first scanned wavelength is scanned, the plurality respective data points including a plurality of respective sample interferometer first-wavelength quadrature signal measurements, and at least one of the respective data points including a respective second-wavelength quadrature signal measurement;

correcting the plurality of respective sample interferometer first-wavelength quadrature signal measurements for dc offset and amplitude error components to provide a plurality of respective offset-and-amplitude-corrected sample interferometer first-wavelength quadrature signal measurements;

determining a plurality of respective sample interferometer first-wavelength phase measurements based on the respective offset-and-amplitude-corrected sample interferometer first-wavelength quadrature signal measurements;

analyzing a set of respective sample interferometer first-wavelength phase measurements that span at least $2\pi$ radians of phase shift to determine a phase error component in the plurality of respective sample interferometer first-wavelength phase measurements, and to correct the phase error component to provide a set of at least one respective phase-corrected sample interferometer first-wavelength phase measurement;

correcting at least one respective sample interferometer second-wavelength quadrature signal measurement for dc offset and amplitude error components to provide at least one offset-and-amplitude-corrected sample interferometer second-wavelength quadrature signal measurement;

determining at least one respective second-wavelength phase measurements based on at least one respective offset-and-amplitude-corrected sample interferometer second-wavelength quadrature signal measurement;

determining at least one respective intermediate wavelength phase measurement having a corresponding respective medium wavelength, each respective intermediate wavelength phase measurement being based on a respective sample interferometer second-wavelength phase measurement and a respective phase-corrected sample interferometer first-wavelength phase measurement;

determining a medium-resolution absolute distance measurement based on the at least one respective intermediate wavelength phase measurement having a corresponding respective medium wavelength;

determining at least one respective fine wavelength phase measurement having a corresponding known respective wavelength of light, each respective fine wavelength phase measurement being based on one of a respective sample interferometer second-wavelength phase measurement that includes a correction for at least one error component and a respective sample interferometer first-wavelength phase measurement that includes a correction for at least one error component; and determining a high-resolution absolute distance measurement based on the medium-resolution absolute distance measurement and the at least one respective fine wavelength phase measurement having a corresponding respective wavelength of light.

2. A method for operating an absolute interferometer, comprising:

inputting a first scanned wavelength over a first wavelength range, and a second scanned wavelength over a second wavelength range that does not overlap with the first wavelength range, to a sample interferometer beam path;

acquiring a plurality of respective data points over time as the first scanned wavelength and second scanned wavelength are scanned, the plurality respective data points including a plurality of respective sample interferometer first-wavelength quadrature signal measurements and a plurality of respective sample interferometer second-wavelength quadrature signal measurements;

correcting the plurality of respective sample interferometer first-wavelength quadrature signal measurements for dc offset and amplitude error components to provide a plurality of respective offset-and-amplitude-corrected sample interferometer first-wavelength quadrature signal measurements;

determining a plurality of respective sample interferometer first-wavelength phase measurements based on the respective offset-and-amplitude-corrected sample interferometer first-wavelength quadrature signal measurements;

analyzing a set of respective sample interferometer first-wavelength phase measurements that span at least $2\pi$ radians of phase shift to determine a phase error component in the plurality of respective sample interferometer first-wavelength phase measurements, and to correct the phase error component to provide a set of at least one respective phase-corrected sample interferometer first-wavelength phase measurement;

correcting the plurality of respective sample interferometer second-wavelength quadrature signal measurements for dc offset and amplitude error components to provide a plurality of respective offset-and-amplitude-corrected sample interferometer second-wavelength quadrature signal measurements;

determining a plurality of respective sample interferometer second-wavelength phase measurements based on the respective offset-and-amplitude-corrected sample interferometer second-wavelength quadrature signal measurements;

analyzing a set of respective sample interferometer second-wavelength phase measurements that span at least $2\pi$ radians of phase shift to determine a phase error component in the plurality of respective sample interferometer second-wavelength phase measurements, and to correct the phase error component to provide a set of at least one respective phase-corrected sample interferometer second-wavelength phase measurement;

determining at least one respective intermediate wavelength phase measurement having a corresponding respective medium wavelength, each respective intermediate wavelength phase measurement being based on a respective phase-corrected sample interferometer second-wavelength phase measurement and a respective phase-corrected sample interferometer first-wavelength phase measurement;

determining a medium-resolution absolute distance measurement based on the at least one respective intermediate wavelength phase measurement having a corresponding respective medium wavelength;

determining at least one respective fine wavelength phase measurement having a corresponding known respective wavelength of light, each respective fine wavelength phase measurement being based on one of a respective sample interferometer second-wavelength phase measurement that includes a correction for at least one error component and a respective sample interferometer first-wavelength phase measurement that includes a correction for at least one error component; and determining a high-resolution absolute distance measurement based on the medium-resolution absolute distance measurement and the at least one respective fine wavelength phase measurement having a corresponding respective wavelength of light.

3. A method for operating an absolute interferometer, comprising:

inputting a first scanned wavelength over a first wavelength range, and a second scanned wavelength over a second wavelength range that does not overlap with the first wavelength range, to a sample interferometer beam path and to a reference interferometer beam path, the reference interferometer beam path providing a known reference length;

acquiring a plurality of respective data points over time as the first scanned wavelength and the second scanned wavelength are scanned, the plurality respective data points including a plurality of respective sample interferometer first-wavelength quadrature signal measurements, a plurality of respective sample interferometer second-wavelength quadrature signal measurements, a plurality of respective reference interferometer first-wavelength quadrature signal measurements, and a plurality of respective reference interferometer second-wavelength quadrature signal measurements;

correcting the plurality of respective sample interferometer first-wavelength quadrature signal measurements, the plurality of respective sample interferometer second-wavelength quadrature signal measurements, the plurality of respective reference interferometer first-wavelength quadrature signal measurements, and the plurality of respective reference interferometer second-wavelength quadrature signal measurements for dc offset and amplitude error components to provide a plurality of respective offset-and-amplitude-corrected sample interferometer first-wavelength quadrature signal measurements, a plurality of respective offset-and-amplitude-corrected sample interferometer second-wavelength quadrature signal measurements, a plurality of respective offset-and-amplitude-corrected reference interferometer first-wavelength quadrature signal measurements, and a plurality of respective offset-and-amplitude-corrected reference interferometer second-wavelength quadrature signal measurements;

determining a plurality of respective sample interferometer first-wavelength phase measurements based on the respective offset-and-amplitude-corrected sample interferometer first-wavelength quadrature signal measurements;

analyzing a set of respective sample interferometer first-wavelength phase measurements that span at least $2\pi$ radians of phase shift to determine a phase error component in the plurality of respective sample interferometer first-wavelength phase measurements, and to correct the phase error component to provide a set comprising a respective phase-corrected sample interferometer first-wavelength phase measurement;

determining a plurality of respective sample interferometer second-wavelength phase measurements based on the respective offset-and-amplitude-corrected sample interferometer second-wavelength quadrature signal measurements;

analyzing a set of respective sample interferometer second-wavelength phase measurements that span at least $2\pi$ radians of phase shift to determine a phase error component in the plurality of respective sample interferometer second-wavelength phase measurements, and to correct the phase error component to provide a set of at least one respective phase-corrected sample interferometer second-wavelength phase measurement;

determining a plurality of respective reference interferometer first-wavelength phase measurements based on the respective offset-and-amplitude-corrected reference interferometer first-wavelength quadrature signal measurements;

analyzing a set of respective reference interferometer first-wavelength phase measurements that span at least $2\pi$ radians of phase shift to determine a phase error component in the plurality of respective reference interferometer first-wavelength phase measurements, and to correct the phase error component to provide a set of at least one respective phase-corrected reference interferometer first-wavelength phase measurement;

determining a phase change ratio corresponding to dividing a difference between respective phase-corrected sample interferometer first-wavelength phase measurements at respective wavelengths by a difference between respective phase-corrected reference interferometer first-wavelength phase measurements at the same respective wavelengths, based on the plurality of respective phase-corrected sample interferometer first-wavelength phase measurements and the plurality of respective phase-corrected reference interferometer first-wavelength phase measurements;

determining a coarse-resolution absolute distance measurement based on the determined phase change ratio and the known reference length;

determining at least one respective intermediate wavelength phase measurement having a corresponding respective medium wavelength, each respective intermediate wavelength phase measurement being based on a respective phase-corrected sample interferometer second-wavelength phase measurement and a respective phase-corrected sample interferometer first-wavelength phase measurement;

determining a medium-resolution absolute distance measurement based on the coarse-resolution absolute distance measurement and the at least one respective intermediate wavelength phase measurement having a corresponding respective medium wavelength;

determining at least one respective fine wavelength phase measurement having a corresponding known respective wavelength of light, each respective fine wavelength phase measurement being based on one of a respective sample interferometer second-wavelength phase measurement that includes a correction for at least one error component and a respective sample interferometer first-wavelength phase measurement that includes a correction for at least one error component; and determining a high-resolution absolute distance measurement based on the medium-resolution absolute distance measurement and the at least one respective fine wavelength phase measurement having a corresponding respective wavelength of light.

* * * * *